(12) United States Patent
Lin et al.

(10) Patent No.: US 10,884,297 B2
(45) Date of Patent: Jan. 5, 2021

(54) PIXEL STRUCTURE

(71) Applicant: Au Optronics Corporation, Hsinchu (TW)

(72) Inventors: Chin-An Lin, Hsinchu (TW); Kun-Cheng Tien, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/578,289

(22) Filed: Sep. 21, 2019

(65) Prior Publication Data
US 2020/0355968 A1 Nov. 12, 2020

(30) Foreign Application Priority Data
May 10, 2019 (TW) .............................. 108116222 A

(51) Int. Cl.
*G02F 1/1343* (2006.01)
(52) U.S. Cl.
CPC .. *G02F 1/134336* (2013.01); *G02F 1/134363* (2013.01); *G02F 2001/134345* (2013.01); *G02F 2201/122* (2013.01); *G02F 2201/52* (2013.01)

(58) Field of Classification Search
None
See application file for complete search history.

(56) References Cited

U.S. PATENT DOCUMENTS

| | | | |
|---|---|---|---|
| 2005/0036085 A1* | 2/2005 | Sunohara | G02F 1/1393 349/106 |
| 2008/0297708 A1 | 12/2008 | Yang et al. | |
| 2009/0032265 A1 | 2/2009 | Borak, Jr. et al. | |
| 2009/0322659 A1 | 12/2009 | Chan et al. | |
| 2011/0242443 A1* | 10/2011 | Choi | G02F 1/1393 349/38 |
| 2013/0229608 A1* | 9/2013 | Lee | G02F 1/134309 349/138 |
| 2013/0293822 A1 | 11/2013 | Chung et al. | |
| 2014/0085583 A1* | 3/2014 | Lu | G02F 1/134309 349/141 |
| 2014/0327852 A1* | 11/2014 | Chung | G02F 1/133707 349/43 |
| 2016/0216569 A1* | 7/2016 | Lee | G02F 1/134309 |
| 2016/0320678 A1* | 11/2016 | Shin | G02F 1/134309 |
| 2016/0342038 A1* | 11/2016 | Shih | G02F 1/136286 |
| 2019/0004379 A1* | 1/2019 | Shin | G02F 1/134309 |

FOREIGN PATENT DOCUMENTS

TW 201142441 12/2011

* cited by examiner

*Primary Examiner* — Ryan Crockett
(74) *Attorney, Agent, or Firm* — JCIPRNET

(57) ABSTRACT

A pixel structure includes a first sub-pixel, a second sub-pixel, and a third sub-pixel. Each of first pixel electrodes has first branch portions. Each of the first pixel electrodes has a first outline. The first branch portions of each of the first pixel electrodes and one of first connecting electrodes have a first junction. The first junction has a length. The first outline has a length. Each of the first sub-pixel, the second sub-pixel, and the third sub-pixel has a first ratio of the length of the first junction to the length of the first outline. The first ratios of at least two of the first sub-pixel, the second sub-pixel, and the third sub-pixel are substantially different.

30 Claims, 23 Drawing Sheets

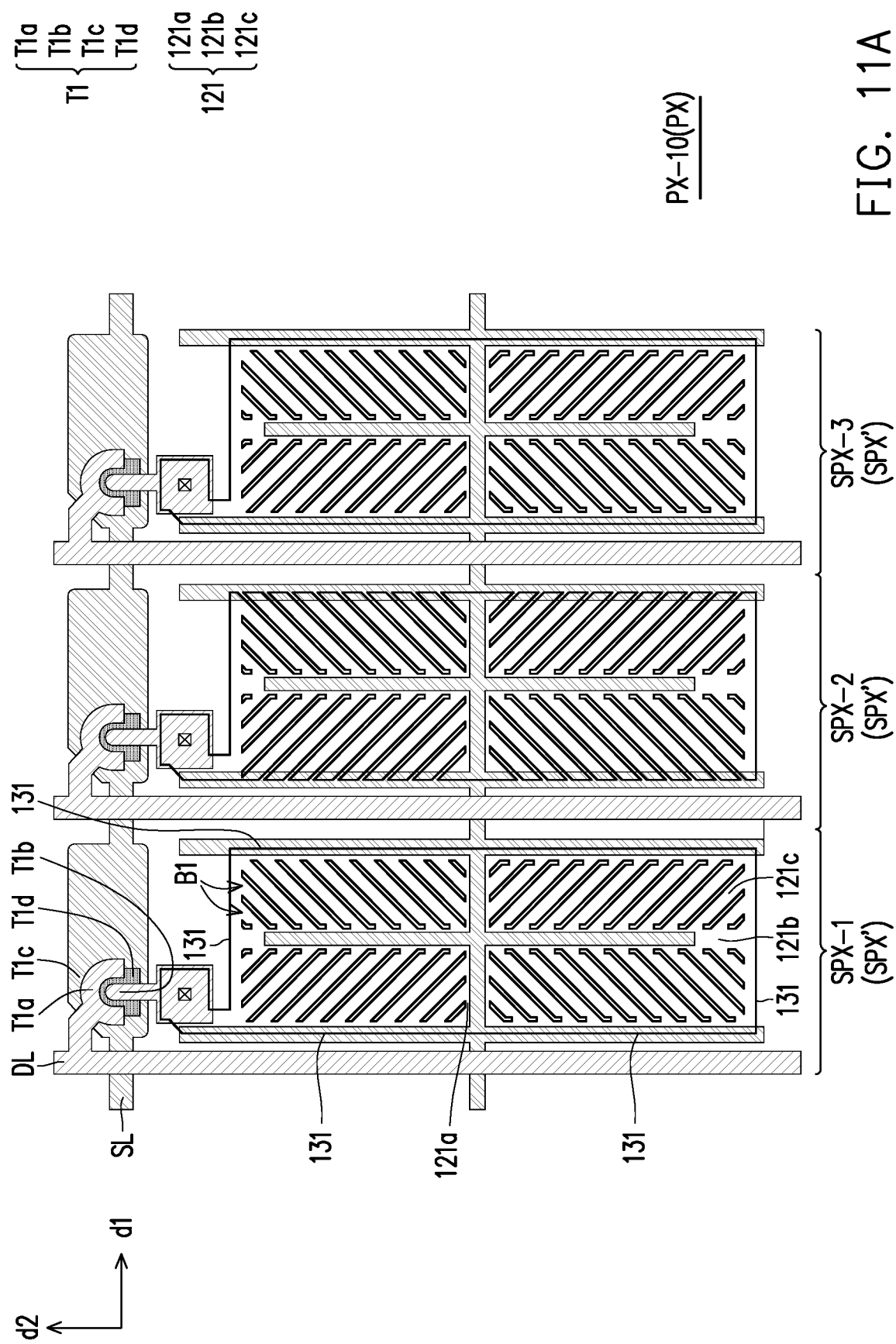

PIXEL STRUCTURE

CROSS-REFERENCE TO RELATED APPLICATION

This application claims the priority benefit of Taiwan application serial no. 108116222, filed on May 10, 2019. The entirety of the above-mentioned patent application is hereby incorporated by reference herein and made a part of this specification.

BACKGROUND

Technical Field

The disclosure relates to a pixel structure, and in particular, to a pixel structure for a display device.

Description of Related Art

A thin film transistor liquid crystal display (TFT-LCD) with high image quality, good space utilization efficiency, low power consumption, and no radiation has become the mainstream in the market.

At present, the performance requirements of liquid crystal display devices in the market involve the characteristics of high contrast ratio, no gray scale inversion, little color shift, high luminance, high color richness, high color saturation, fast response, wide viewing angle, etc. At present, technologies capable of achieving the requirements of wide viewing angle include an in-plane switching (IPS) liquid crystal display, a fringe field switching (FFS) liquid crystal display, a multi-domain vertically alignment (MVA) liquid crystal display, and other modes. However, when a skin color frame of a liquid crystal display device is viewed at a large angle, there is still a problem of color washout, blue shift, or green shift.

SUMMARY

The disclosure provides a pixel structure, where a display device using the pixel structure is excellent in optical performance.

The pixel structure of the disclosure is applicable to a display device. The display device is formed by sandwiching a liquid crystal layer between a first substrate and a second substrate. The pixel structure includes a first sub-pixel, a second sub-pixel, a third sub-pixel, a plurality of first pixel electrodes, and a plurality of first connecting electrodes. The first pixel electrodes are formed in the first sub-pixel, the second sub-pixel, and the third sub-pixel respectively to control an alignment direction of a plurality of liquid crystal molecules of the liquid crystal layer. Each of the first pixel electrodes has a plurality of first branch portions. Each of the first pixel electrodes has a first outline. The first outline is located at a plurality of endpoints of the first branch portions, and the first outline has at least four sides. The first connecting electrodes are formed in the first sub-pixel, the second sub-pixel, and the third sub-pixel respectively, and provided on at least one portion of the first outlines of the first pixel electrodes. The first branch portions of each of the first pixel electrodes and one of the first connecting electrodes have a first junction. The first junction is located on the first outline. The first junction has a length. The first outline has a length. Each of the first sub-pixel, the second sub-pixel, and the third sub-pixel has a first ratio of the length of the first junction to the length of the first outline. A plurality of first ratios of at least two of the first sub-pixel, the second sub-pixel, and the third sub-pixel is substantially different.

In an embodiment of the disclosure, the first ratio of the first sub-pixel and the first ratio of the second sub-pixel have a difference $\Delta R1$, $10\% \leq \Delta R1 \leq 75\%$.

In an embodiment of the disclosure, each of the first pixel electrodes further has a plurality of first trunk portions crossing each other. The first trunk portions define a plurality of first alignment areas. The first branch portions are configured in the first alignment areas respectively. Each of the first branch portions has a first endpoint and a second endpoint opposite to each other. The first endpoint is connected to at least one of the first trunk portions. The first outline is located at the second endpoints of the first branch portions.

In an embodiment of the disclosure, the first ratio of the first sub-pixel is substantially greater than the first ratio of the second sub-pixel, and the first ratio of the second sub-pixel is substantially greater than the first ratio of the third sub-pixel.

In an embodiment of the disclosure, the first ratio of the first sub-pixel is substantially greater than the first ratio of the second sub-pixel, and the first ratio of the second sub-pixel is substantially equal to the first ratio of the third sub-pixel.

In an embodiment of the disclosure, the first ratio of the first sub-pixel is substantially greater than the first ratio of the second sub-pixel, and the first ratio of the first sub-pixel is substantially equal to the first ratio of the third sub-pixel.

In an embodiment of the disclosure, the at least four sides of the first outline include a plurality of first sides arranged in a first direction and a plurality of second sides arranged in a second direction. The first sides of the first sub-pixel are provided with one of the first connecting electrodes, and at least one of the second sides of the first sub-pixel is not provided with the first connecting electrodes. The first sides and the second sides of the second sub-pixel are provided with one of the first connecting electrodes. The first sides and the second sides of the third sub-pixel are provided with one of the first connecting electrodes.

In an embodiment of the disclosure, the at least four sides of the first outline include a plurality of first sides arranged in a first direction and a plurality of second sides arranged in a second direction. The first sides of the first sub-pixel are provided with one of the first connecting electrodes, and at least one of the second sides of the first sub-pixel is not provided with the first connecting electrodes. The first sides of the second sub-pixel are not provided with the first connecting electrodes, and the second sides of the second sub-pixel are provided with one of the first connecting electrodes. The first sides and the second sides of the third sub-pixel are provided with one of the first connecting electrodes.

In an embodiment of the disclosure, the at least four sides of the first outline include a plurality of first sides arranged in a first direction and a plurality of second sides arranged in a second direction. The first sides of the first sub-pixel are provided with one of the first connecting electrodes, and at least one of the second sides of the first sub-pixel is not provided with the first connecting electrodes. The first sides of the second sub-pixel are not provided with the first connecting electrodes, and the second sides of the second sub-pixel are provided with one of the first connecting electrodes. The first sides of the third sub-pixel are not provided with the first connecting electrodes, and the second sides of the third sub-pixel are provided with one of the first connecting electrodes.

In an embodiment of the disclosure, the at least four sides of the first outline include a plurality of first sides arranged in a first direction and a plurality of second sides arranged in a second direction. The first sides and the second sides of the first sub-pixel are provided with one of the first connecting electrodes. The first sides of the second sub-pixel are not provided with the first connecting electrodes, and the second sides of the second sub-pixel are provided with one of the first connecting electrodes. The first sides of the third sub-pixel are not provided with the first connecting electrodes, and the second sides of the third sub-pixel are provided with one of the first connecting electrodes.

In an embodiment of the disclosure, the at least four sides of the first outline include a plurality of first sides arranged in a first direction and a plurality of second sides arranged in a second direction. The first sides of the first sub-pixel are provided with one of the first connecting electrodes, and at least one of the second sides of the first sub-pixel is not provided with the first connecting electrodes. The first sides and the second sides of the second sub-pixel are provided with one of the first connecting electrodes. The first sides of the third sub-pixel are not provided with the first connecting electrodes, and the second sides of the third sub-pixel are provided with one of the first connecting electrodes.

In an embodiment of the disclosure, the at least four sides of the first outline include a plurality of first sides arranged in a first direction and a plurality of second sides arranged in a second direction. The first sides and the second sides of the first sub-pixel are provided with one of the first connecting electrodes. The first sides and the second sides of the second sub-pixel are provided with one of the first connecting electrodes. The first sides of the third sub-pixel are not provided with the first connecting electrodes, and the second sides of the third sub-pixel are provided with one of the first connecting electrodes.

In an embodiment of the disclosure, the at least four sides of the first outline include a plurality of first sides arranged in a first direction and a plurality of second sides arranged in a second direction. The first sides and the second sides of the first outline of the first sub-pixel are provided with one of the first connecting electrodes. The first sides of the first outline of the second sub-pixel are not provided with the first connecting electrodes, and the second sides of the first outline of the second sub-pixel are provided with one of the first connecting electrodes. The first sides and the second sides of the first outline of the third sub-pixel are provided with one of the first connecting electrodes.

In an embodiment of the disclosure, the pixel structure further includes a plurality of second pixel electrodes and a plurality of second connecting electrodes. The second pixel electrodes are structurally separated from the first pixel electrodes. The second pixel electrodes are formed in the first sub-pixel, the second sub-pixel, and the third sub-pixel respectively to control an alignment direction of a plurality of liquid crystal molecules of the liquid crystal layer. Each of the second pixel electrodes has a plurality of second branch portions. Each of the second pixel electrodes has a second outline. The second outline is located at a plurality of endpoints of the second branch portions, and the second outline has at least four sides. The second connecting electrodes are formed in the first sub-pixel, the second sub-pixel, and the third sub-pixel respectively, and provided on at least one portion of the second outlines of the second pixel electrodes. The second branch portions of each of the second pixel electrodes and one of the second connecting electrodes have a second junction. The second junction is located on the second outline. The second junction has a length. The second outline has a length. Each of the first sub-pixel, the second sub-pixel, and the third sub-pixel has a second ratio of the length of the second junction to the length of the second outline. A plurality of second ratios of at least two of the first sub-pixel, the second sub-pixel, and the third sub-pixel is substantially different.

In an embodiment of the disclosure, the second ratio of the first sub-pixel and the second ratio of the second sub-pixel have a difference $\Delta R2$, $10\% \leq \Delta R2 \leq 75\%$.

In an embodiment of the disclosure, each of the second pixel electrodes further has a plurality of second trunk portions crossing each other. The second trunk portions define a plurality of second alignment areas. The second branch portions are configured in the second alignment areas respectively. Each of the second branch portions has a first endpoint and a second endpoint opposite to each other. The first endpoint of each of the second branch portions is connected to at least one of the second trunk portions. The second outline is located at the second endpoints of the second branch portions.

In an embodiment of the disclosure, the second ratio of the first sub-pixel is substantially greater than the second ratio of the second sub-pixel, and the second ratio of the second sub-pixel is substantially greater than the second ratio of the third sub-pixel.

In an embodiment of the disclosure, the second ratio of the first sub-pixel is substantially greater than the second ratio of the second sub-pixel, and the second ratio of the second sub-pixel is substantially equal to the second ratio of the third sub-pixel.

In an embodiment of the disclosure, the second ratio of the first sub-pixel is substantially greater than the second ratio of the second sub-pixel, and the second ratio of the first sub-pixel is substantially equal to the second ratio of the third sub-pixel.

In an embodiment of the disclosure, the first ratio of one of the first sub-pixel, the second sub-pixel, and the third sub-pixel is substantially different from the second ratio of the one of the first sub-pixel, the second sub-pixel, and the third sub-pixel.

In order to make the aforementioned features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

FIG. 11A is a schematic top view of a pixel structure PX according to a tenth embodiment of the disclosure.

DESCRIPTION OF THE EMBODIMENTS

Figure 1:
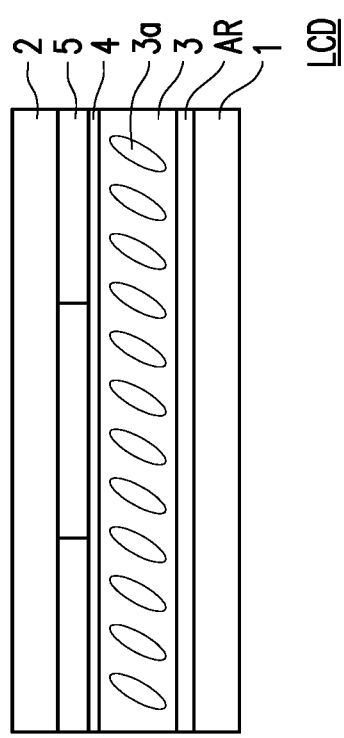
FIG. 1 is a cross-section schematic view of a display device LCD according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

It should be understood that when a component such as a layer, film, region or substrate is referred to as being "on" or "connected" to another component, it may be directly on or connected to the another component, or intervening components may also be present. In contrast, when a component is referred to as being "directly on" or "directly connected to" another component, there are no intervening assemblies present. As used herein, "connection" may refer to a physical and/or electrical connection. In addition, an "electrical connection" or "coupling" may be the another component between two components.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", or "substantially" may depend on optical properties, etch properties, or other properties to select a more acceptable range of deviations or standard deviations without one standard deviation for all properties.

Unless otherwise defined, all terms (including technical and scientific terms) used herein have the same meaning as commonly understood by one of ordinary skill in the art to which the disclosure belongs. It will be further understood that terms such as those defined in commonly used dictionaries should be interpreted as having a meaning that is consistent with their meaning in the context of the relevant art and the disclosure and will not be interpreted in an idealized or overly formal sense unless expressly so defined herein.

FIG. 1 is a cross-section schematic view of a display device LCD according to an embodiment of the disclosure.

Figure 2A:
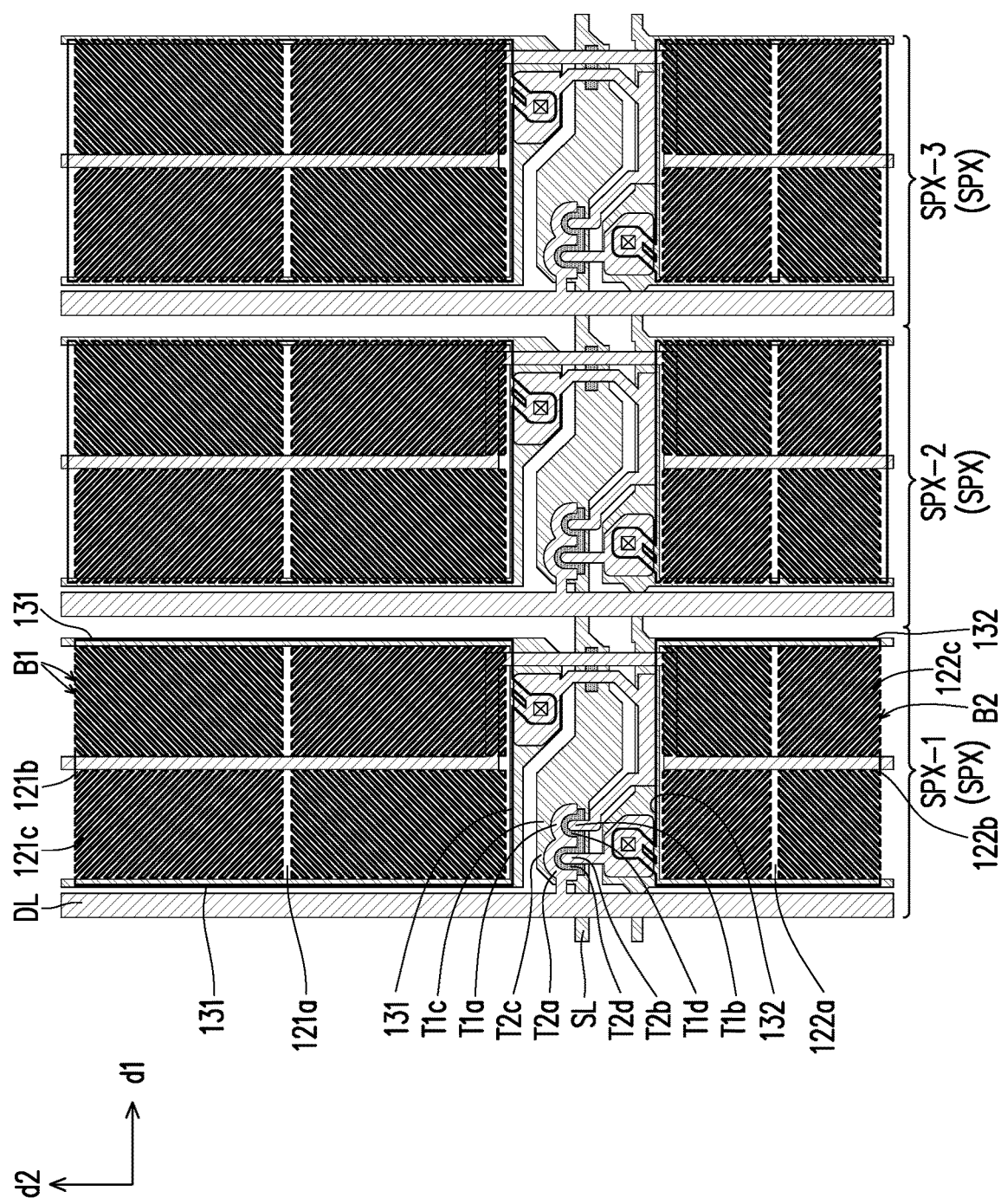
FIG. 2A is a schematic top view of a pixel structure PX according to a first embodiment of the disclosure.
Figure 2B:
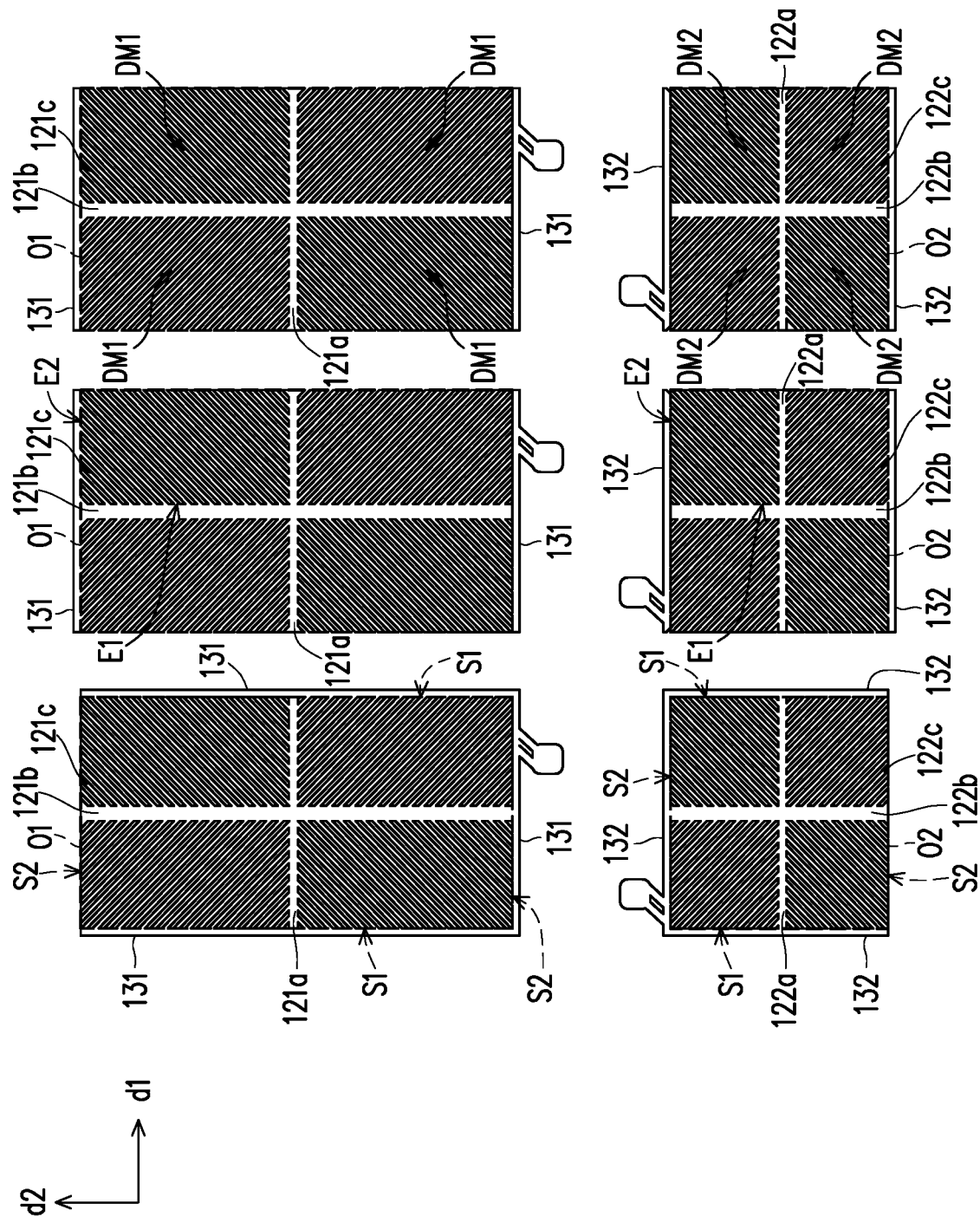
FIG. 2B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 2A.

FIG. 2A is a schematic top view of a pixel structure PX according to a first embodiment of the disclosure. FIG. 2B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 2A.

Referring to FIG. 1 and FIG. 2A, the display device LCD is formed by sandwiching a liquid crystal layer 3 between a first substrate 1 and a second substrate 2. The first substrate 1 is provided with a pixel array AR. The pixel array AR includes a plurality of pixel structures PX arranged on the first substrate 1 in an array. Each of the pixel structures PX includes a plurality of sub-pixels SPX. A plurality of first pixel electrodes 121 is formed in the sub-pixels SPX respectively to control an alignment direction of a plurality of liquid crystal molecules 3a of the liquid crystal layer 3.

Specifically, in the present embodiment, the display device LCD further includes a common electrode 4. A potential difference between the common electrode 4 and the first pixel electrodes 121 is used to drive the liquid crystal molecules 3a to cause the display device LCD to display a frame. For example, in the present embodiment, the common electrode 4 may be selectively provided on the second substrate 2. That is, in the present embodiment, the first pixel electrodes 121 and the common electrode 4 are provided on two different substrates (i.e., the first substrate 1 and the second substrate 2). However, the disclosure is not limited thereto. According to other embodiments, the first pixel electrodes 121 and the common electrode 4 may also be respectively provided on the same substrate (i.e., the first substrate 1).

The sub-pixels SPX of each of the pixel structures PX are used to display a variety of different colors. For example, in the present embodiment, each of the pixel structures PX includes a first sub-pixel SPX-1, a second sub-pixel SPX-2, and a third sub-pixel SPX-3. The first sub-pixel SPX-1, the second sub-pixel SPX-2, and the third sub-pixel SPX-3 are used to display a first color, a second color, and a third color, respectively. The first color, the second color, and the third color are, for example, red, green, and blue, but the disclosure is not limited thereto.

Specifically, in the present embodiment, the display device LCD further includes a color filter layer 5. The color filter layer 5 has a plurality of filter patterns overlapping the first sub-pixel electrodes 121. The sub-pixels SPX can display a variety of colors by the filter patterns. For example, in the present embodiment, the color filter layer 5 may be provided on the second substrate 2; that is, the sub-pixels SPX and the color filter layer 5 may be provided on two different substrates (i.e., the first substrate 1 and the second substrate 2). However, the disclosure is not limited thereto. According to other embodiments, the sub-pixels SPX and the color filter layer 5 may also be respectively provided on the same substrate (i.e., the first substrate 1) to form a structure of color filter on array.

Referring to FIG. 2A and FIG. 2B, each of the sub-pixels SPX includes a data line DL, a scan line SL, a first thin film transistor T1, and a first pixel electrode 121. The data line DL and the scan line SL are alternately provided. The first thin film transistor T1 has a first end T1a, a second end T1b, a control end T1c, and a semiconductor pattern T1d. The first end T1a and the second end T1b are electrically connected to different areas of the semiconductor pattern T1d, respectively. The first end T1a of the first thin film transistor T1 is electrically connected to the data line DL. The control end T1c of the first thin film transistor T1 is electrically connected to the scan line SL. The second end T1b of the first thin film transistor T1 is electrically connected to the first pixel electrode 121.

Each of the first pixel electrodes 121 has a plurality of first branch portions 121c. Each of the first pixel electrodes 121 has a first outline O1. The first outline O1 is located at a plurality of endpoints of the first branch portions 121c. The first outline O1 has at least four sides.

For example, in the present embodiment, the first pixel electrode PX1 further includes a first trunk portion 121a and a first trunk portion 121b. The first trunk portion 121a and the first trunk portion 121b cross each other. The first trunk portion 121a and the first trunk portion 121b define a plurality of first alignment areas DM1. The first branch portions 121c are configured on the first alignment areas DM1 respectively. Each of the first branch portions 121c has a first endpoint E1 and a second endpoint E2 opposite to each other. The first endpoint E1 of each of the first branch portions 121c is connected to at least one of the first trunk portions 121a, 121b. The first outline O1 of the first pixel electrode PX1 is located at the second endpoints E2 of the first branch portions 121c. The first outline O1 at least has two opposite first sides S1 and two opposite second sides S2. The two first sides S1 are arranged in a first direction d1, the two second sides S2 are arranged in a second direction d2, and the first direction d1 and the second direction d2 are staggered. In the present embodiment, the first direction d1 and the second direction d2 may be perpendicular, but the disclosure is not limited thereto.

In the present embodiment, each of the sub-pixels SPX may further selectively include a second thin film transistor T2 and a second pixel electrode 122. The second thin film transistor T2 has a first end T2a, a second end T2b, a control end T2c, and a semiconductor pattern T2d. The first end T2a and the second end T2b are electrically connected to different areas of the semiconductor pattern T2d, respectively. The first pixel electrode 121 is structurally separated from the second pixel electrode 122. The second pixel electrode 122 is electrically connected to the second end T2b of the second thin film transistor T2.

Each of the second pixel electrodes 122 has a plurality of second branch portions 122c. Each of the second pixel electrodes 122 has a second outline O2. The second outline O2 is located at a plurality of endpoints of the second branch portions 122c. The second outline O2 has at least four sides.

For example, in the present embodiment, the second pixel electrode PX2 further includes a second trunk portion 122a and a second trunk portion 122b. The second trunk portion 122a and the second trunk portion 122b cross each other. The second trunk portion 122a and the second trunk portion 122b define a plurality of second alignment areas DM2. The second branch portions 122c are configured on the second alignment areas DM2 respectively. Each of the second branch portions 122c has a first endpoint E1 and a second endpoint E2 opposite to each other. The first endpoint E1 of each of the second branch portions 122c is connected to at least one of the second trunk portions 122a, 122b. The second pixel electrode PX2 has a second outline O2. The second outline O2 is located at the second endpoints E2 of the second branch portions 122c. The second outline O2 at least has two opposite first sides S1 and two opposite second sides S2. The first sides S1 are arranged in a first direction d1, the second sides S2 are arranged in a second direction d2, and the first direction d1 and the second direction d2 are staggered. In the present embodiment, the first direction d1 and the second direction d2 may be perpendicular, but the disclosure is not limited thereto.

In the present embodiment, the first end T1a of the first thin film transistor T1 and the first end T2a of the second thin film transistor T2 may be selectively electrically connected to the same data line DL, and the control end T1c of the first thin film transistor T1 and the control end T2c of the second thin film transistor T2 may be selectively electrically connected to the same scan line SL, but the disclosure is not limited thereto.

In the present embodiment, the sub-pixel SPX may be selectively driven by means of one data line and one gate line (1D1G) (that is, two sub-pixels SPX located in the same row and adjacent two columns share the same data line DL, and two scan lines SL of the two sub-pixels SPX located in the same row and adjacent two columns sequentially have a gate on potential).

However, the disclosure is not limited thereto. According to other embodiments, the sub-pixel SPX may also be driven in other ways and/or in other configurations. For example, in another embodiment, the sub-pixel SPX may also be driven by means of two data lines and half gate line (2DhG) (that is, two sub-pixels SPX located in the same row and adjacent two columns use different data lines DL respectively, and two scan lines SL of the two sub-pixels SPX in the same row and adjacent two columns simultaneously have a gate on potential). In an embodiment not shown, the first thin film transistor T1 and the second thin film transistor T2 of the same sub-pixel share the same scan line SL and are electrically connected to two different data lines DL, respectively. The sub-pixel may be driven by means of two data lines and one gate line (2D1G) (that is, two sub-pixels located in the same row and adjacent two columns share the same two data lines DL, and two scan lines SL of the two sub-pixels located in the same row and adjacent two columns sequentially have a gate on potential).

The pixel structure PX further includes a plurality of first connecting electrodes 131, formed in the sub-pixels SPX respectively and provided on at least one portion of the first outlines O1 of the first pixel electrodes 121 of the sub-pixels SPX. In the present embodiment, the first connecting electrodes 131 and the first pixel electrodes 121 may be formed on the same film layer and connected to each other.

The first branch portions 121c of each of the first pixel electrodes 121 and the first connecting electrodes 131 have a first junction B1. The first junction B1 refers to a place where the first branch portions 121c are in contact with the first connecting electrodes 131. The first junction B1 is located on the first outline O1 of the first pixel electrode 121.

The first outline O1 may be an annular line segment surrounding the first branch portions 121c of the first pixel electrode 121. The first junction B1 may refer to a plurality of line segments respectively located at the second endpoints E2 of the first branch portions 121c and spaced apart from each other. For example, in the present embodiment, the first outline O1 may be a rectangle surrounding the first branch portions 121c of the first pixel electrode 121, and the first junction B1 may be a plurality of straight line segments located on the rectangle and spaced apart from each other. However, the disclosure is not limited thereto. According to other embodiments, the first outline O1 and/or the first junction B1 may also be in other forms.

In the present embodiment, the pixel structure PX further includes a plurality of second connecting electrodes 132, formed in the sub-pixels SPX respectively and provided on at least one portion of the second outlines O2 of the second pixel electrodes 122 of the sub-pixels SPX. In the present embodiment, the second connecting electrodes 132 and the second pixel electrodes 122 may be formed on the same film layer and connected to each other.

The second branch portions 122c of each of the second pixel electrodes 122 and the second connecting electrodes 132 have a second junction B2. The second junction B2 refers to a place where the second branch portions 122c are in contact with the second connecting electrodes 132. The second junction B2 is located on the second outline O2 of the second pixel electrode 122.

The second outline O2 may be an annular line segment surrounding the second branch portions 122c of the second pixel electrode 122. The second junction B2 may refer to a plurality of line segments respectively located at the second endpoints E2 of the second branch portions 122c and spaced apart from each other. For example, in the present embodiment, the second outline O2 may be a rectangle surrounding the second branch portions 122c of the second pixel electrode 122, and the second junction B2 may be a plurality of straight line segments located on the rectangle and spaced apart from each other. However, the disclosure is not limited thereto. According to other embodiments, the second outline O2 and/or the second junction B2 may also be in other forms.

The first junction B1 of the first branch portions 121c of each of the first pixel electrodes 121 and the first connecting electrodes 131 has a length. The first outline O1 of each of the first pixel electrodes 121 has a length. Each of the sub-pixels SPX has a first ratio of the length of the first junction B1 to the length of the first outline O1.

The second junction B2 of the second branch portions 122c of each of the second pixel electrodes 122 and the second connecting electrodes 132 has a length. The second outline O2 of each of the second pixel electrodes 122 has a length. Each of the sub-pixels SPX has a second ratio of the length of the second junction B2 to the length of the second outline O2.

The display device LCD includes at least one pixel structure PX-1. A plurality of first ratios of at least two sub-pixels SPX of the pixel structure PX-1 is substantially different. In the present embodiment, different first ratios have a difference $\Delta R1$, $10\% \leq \Delta R1 \leq 75\%$, but the disclosure is not limited thereto. In the present embodiment, a plurality of second ratios of at least two sub-pixels SPX of the pixel structure PX-1 may also be substantially different. Different second ratios have a difference $\Delta R2$, $10\% \leq \Delta R2 \leq 75\%$, but the disclosure is not limited thereto.

In the present embodiment, the first ratio of the first sub-pixel SPX-1 is substantially greater than the first ratio of the second sub-pixel SPX-2, and the first ratio of the second sub-pixel SPX-2 is substantially equal to the first ratio of the third sub-pixel SPX-3.

For example, in the present embodiment, the first sides S1 of the first outline O1 of the first sub-pixel SPX-1 are provided with the first connecting electrode 131, and one second side S2 of the first outline O1 of the first sub-pixel SPX-1 is not provided with the first connecting electrode 131. The first sides S1 of the first outline O1 of the second sub-pixel SPX-2 are not provided with the first connecting electrode 131, and the second sides S2 of the first outline O1 of the second sub-pixel SPX-2 are provided with the first connecting electrode 131. The first sides S1 of the first outline O1 of the third sub-pixel SPX-3 are not provided with the first connecting electrode 131, and the second sides S2 of the first outline O1 of the third sub-pixel SPX-3 are provided with the first connecting electrode 131.

In the present embodiment, the second ratio of the first sub-pixel SPX-1 is substantially greater than the second ratio of the second sub-pixel SPX-2, and the second ratio of the second sub-pixel SPX-2 is substantially equal to the second ratio of the third sub-pixel SPX-3.

For example, in the present embodiment, the first sides S1 of the second outline O2 of the first sub-pixel SPX-1 are provided with the second connecting electrode 132, and one second side S2 of the second outline O2 of the first sub-pixel SPX-1 is not provided with the second connecting electrode 132. The first sides S1 of the second outline O2 of the second sub-pixel SPX-2 are not provided with the second connecting electrode 132, and the second sides S2 of the second outline O2 of the second sub-pixel SPX-2 are provided with the second connecting electrode 132. The first sides S1 of the second outline O2 of the third sub-pixel SPX-3 are not provided with the second connecting electrode 132, and the second sides S2 of the second outline O2 of the third sub-pixel SPX-3 are provided with the second connecting electrode 132.

It is worth mentioning that because a plurality of first ratios of at least two of the first sub-pixel SPX-1, the second sub-pixel SPX-2, and the third sub-pixel SPX-3 of at least one pixel structure PX is substantially different, when the display device LCD is viewed at a large viewing angle, the problem of color washout and/or color shift (e.g., green shift and/or blue shift) of a skin color frame of the display device LCD can be improved.

For example, in the present embodiment, because one second side S2 of the first outline O1 of the first sub-pixel SPX-1 is not provided with the first connecting electrode 131, the oblique view luminance of red components of the skin color frame is increased. Because the first sides S1 of the first outline O1 of the second sub-pixel SPX-2 are not provided with the first connecting electrode 131, the oblique view luminance of green components of the skin color frame is reduced. Because the first sides S1 of the first outline O1 of the third sub-pixel SPX-3 are not provided with the first connecting electrode 131, the oblique view luminance of blue components of the skin color frame is reduced. In this way, when the display device LCD is viewed at a large viewing angle, the problem of color washout and/or color shift of the skin color frame of the display device LCD can be improved.

It is to be noted that the following embodiments use the same reference numerals and partial content of the foregoing embodiments. The same reference numerals are used to represent the same or similar elements, and the description of the same technical content is omitted. For the description of the omitted portions, reference may be made to the foregoing embodiments, and the descriptions thereof are omitted in the following embodiments.

Figure 3A:
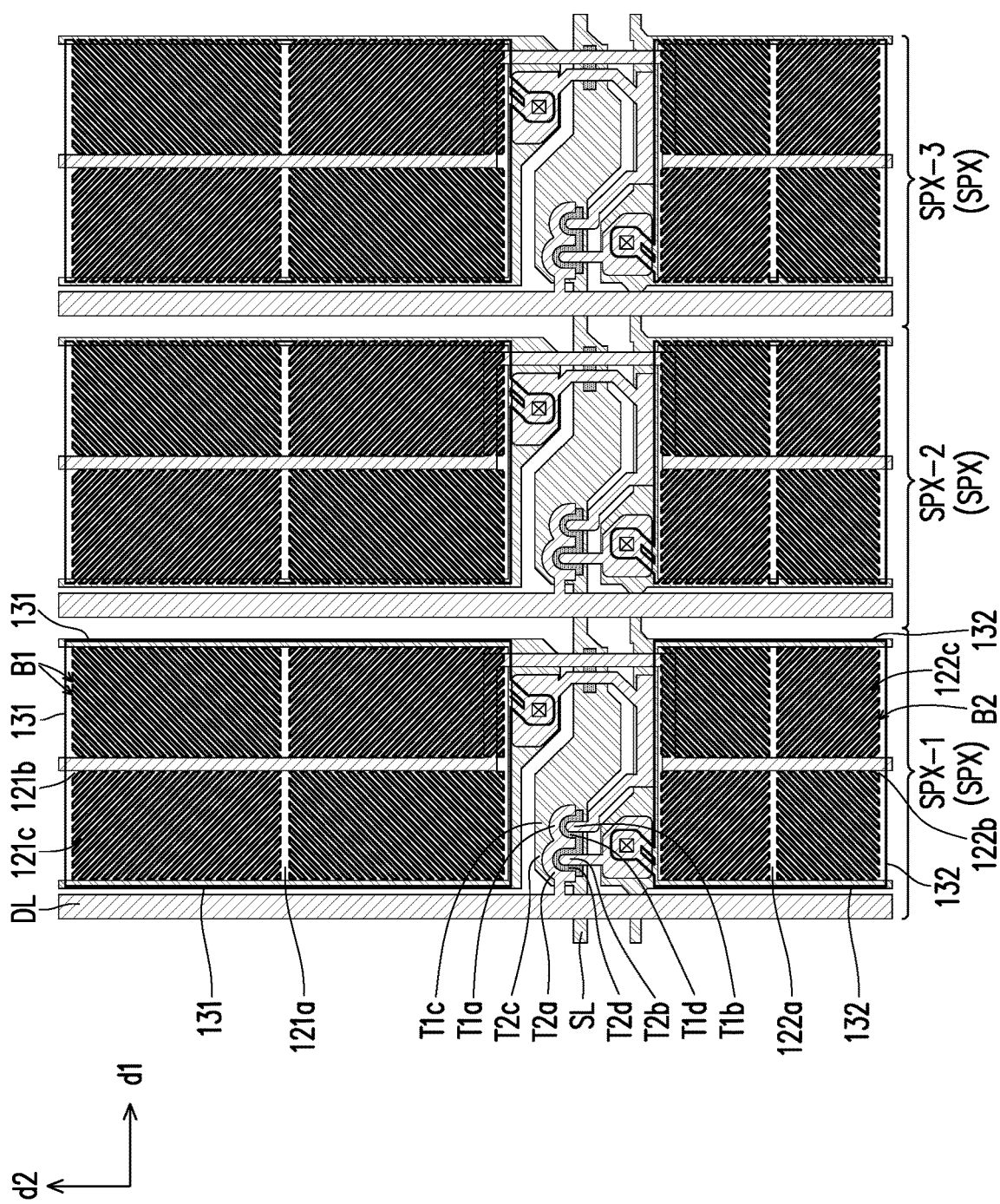
FIG. 3A is a schematic top view of a pixel structure PX according to a second embodiment of the disclosure.
Figure 3B:
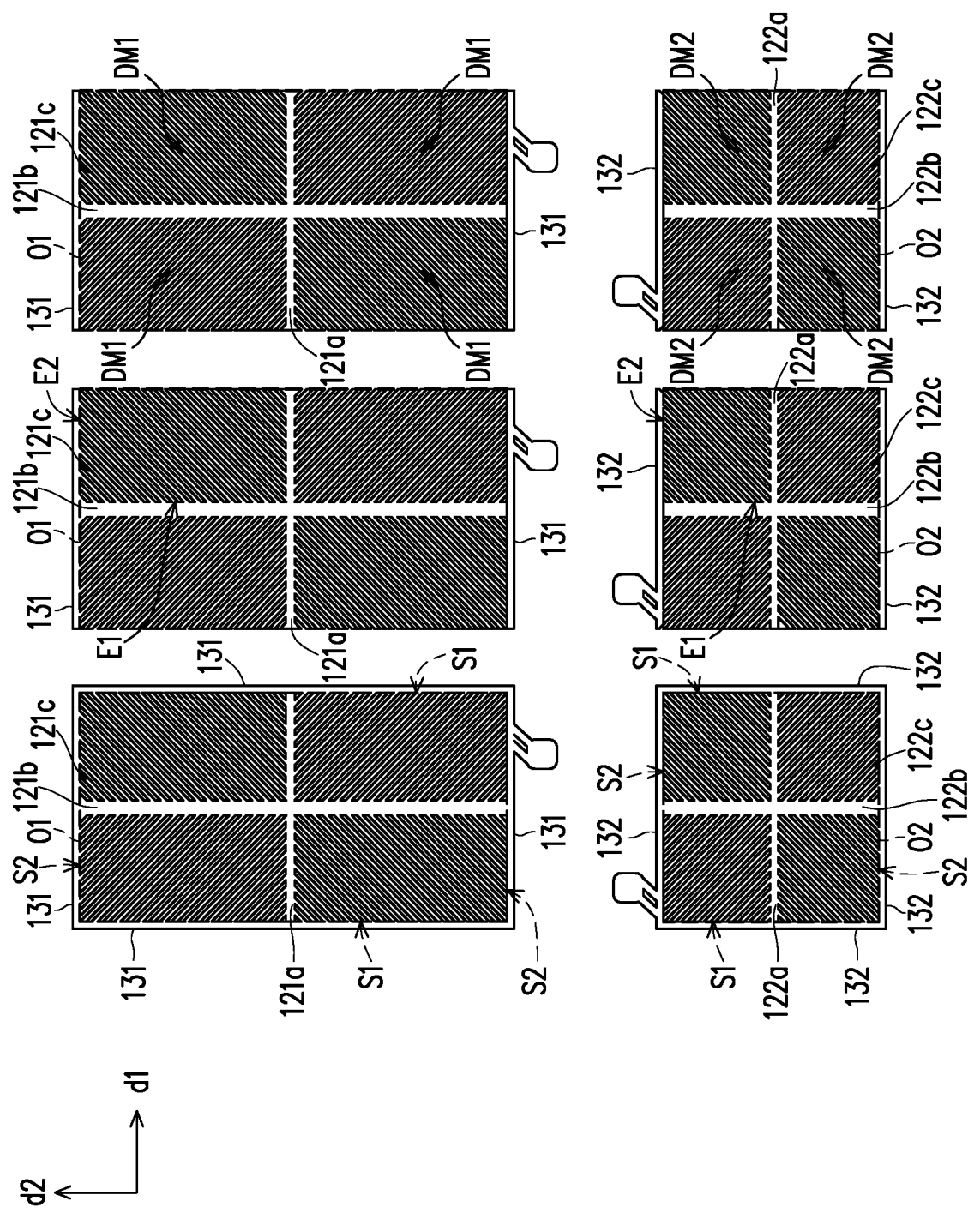
FIG. 3B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 3A.

FIG. 3A is a schematic top view of a pixel structure PX according to a second embodiment of the disclosure. FIG. 3B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 3A.

The pixel structure PX-2 of FIG. 3A is similar to the pixel structure PX-1 of FIG. 2A except that the first connecting electrode 131 and the second connecting electrode 132 of the pixel structure PX-2 and the first connecting electrode 131 and the second connecting electrode 132 of the pixel structure PX-1 are provided at different locations.

Referring to FIG. 3A and FIG. 3B, specifically, in the present embodiment, the first sides S1 and the second sides S2 of the first outline O1 of the first sub-pixel SPX-1 are provided with the first connecting electrode 131. The first sides S1 of the first outline O1 of the second sub-pixel SPX-2 are not provided with the first connecting electrode 131, and the second sides S2 of the first outline O1 of the second sub-pixel SPX-2 are provided with the first connecting electrode 131. The first sides S1 of the first outline O1 of the third sub-pixel SPX-3 are not provided with the first connecting electrode 131, and the second sides S2 of the first outline O1 of the third sub-pixel SPX-3 are provided with the first connecting electrode 131.

The first sides S1 and the second sides S2 of the second outline O2 of the first sub-pixel SPX-1 are provided with the second connecting electrode 132. The first sides S1 of the second outline O2 of the second sub-pixel SPX-2 are not provided with the second connecting electrode 132, and the second sides S2 of the second outline O2 of the second sub-pixel SPX-2 are provided with the second connecting electrode 132. The first sides S1 of the second outline O2 of the third sub-pixel SPX-3 are not provided with the second connecting electrode 132, and the second sides S2 of the second outline O2 of the third sub-pixel SPX-3 are provided with the second connecting electrode 132.

In the present embodiment, the first ratio of the first sub-pixel SPX-1 is substantially greater than the first ratio of the second sub-pixel SPX-2, and the first ratio of the second sub-pixel SPX-2 is substantially equal to the first ratio of the third sub-pixel SPX-3. The second ratio of the first sub-pixel SPX-1 is substantially greater than the second ratio of the second sub-pixel SPX-2, and the second ratio of the second sub-pixel SPX-2 is substantially equal to the second ratio of the third sub-pixel SPX-3.

Figure 4A:
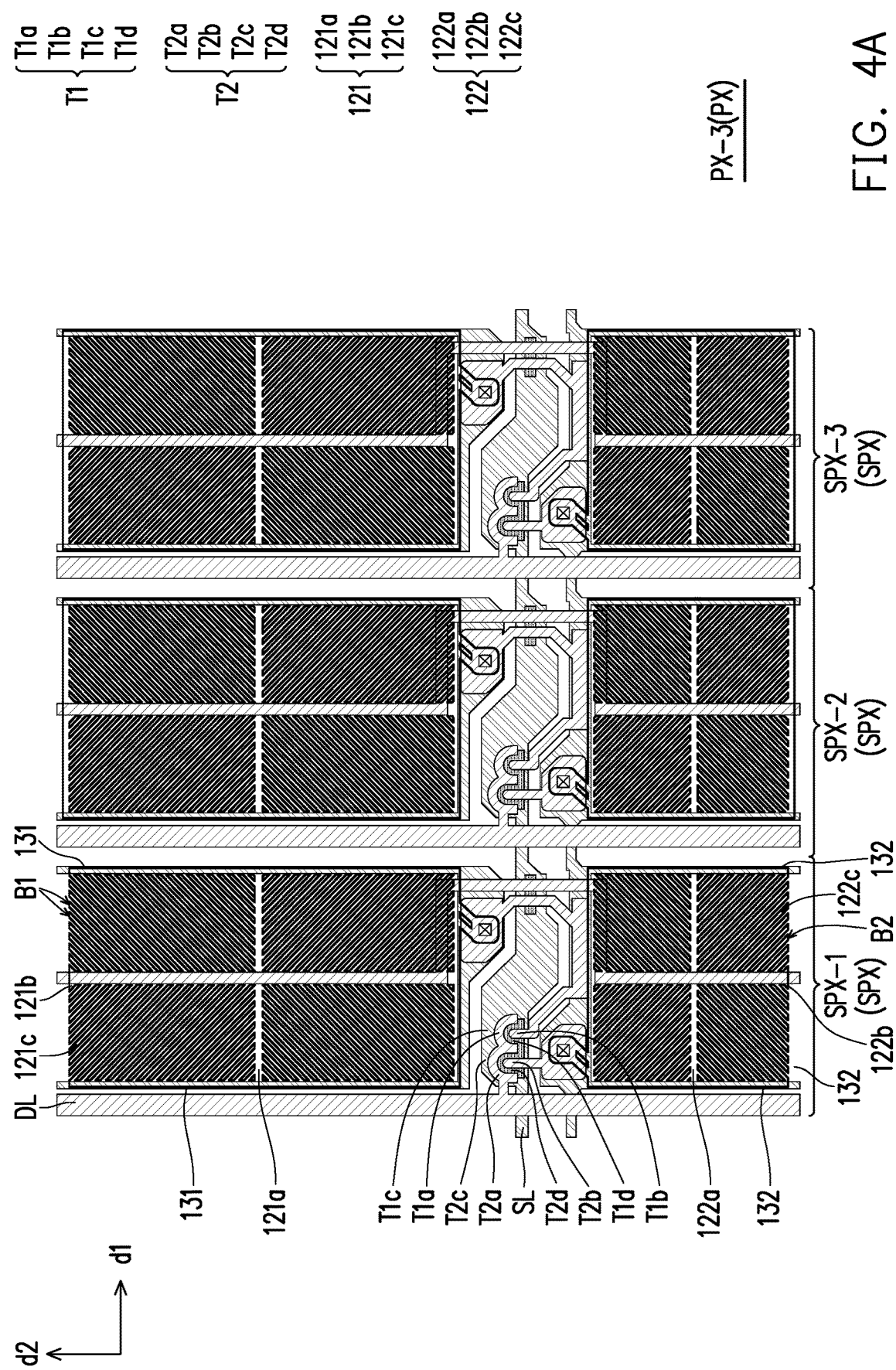
FIG. 4A is a schematic top view of a pixel structure PX according to a third embodiment of the disclosure.
Figure 4B:
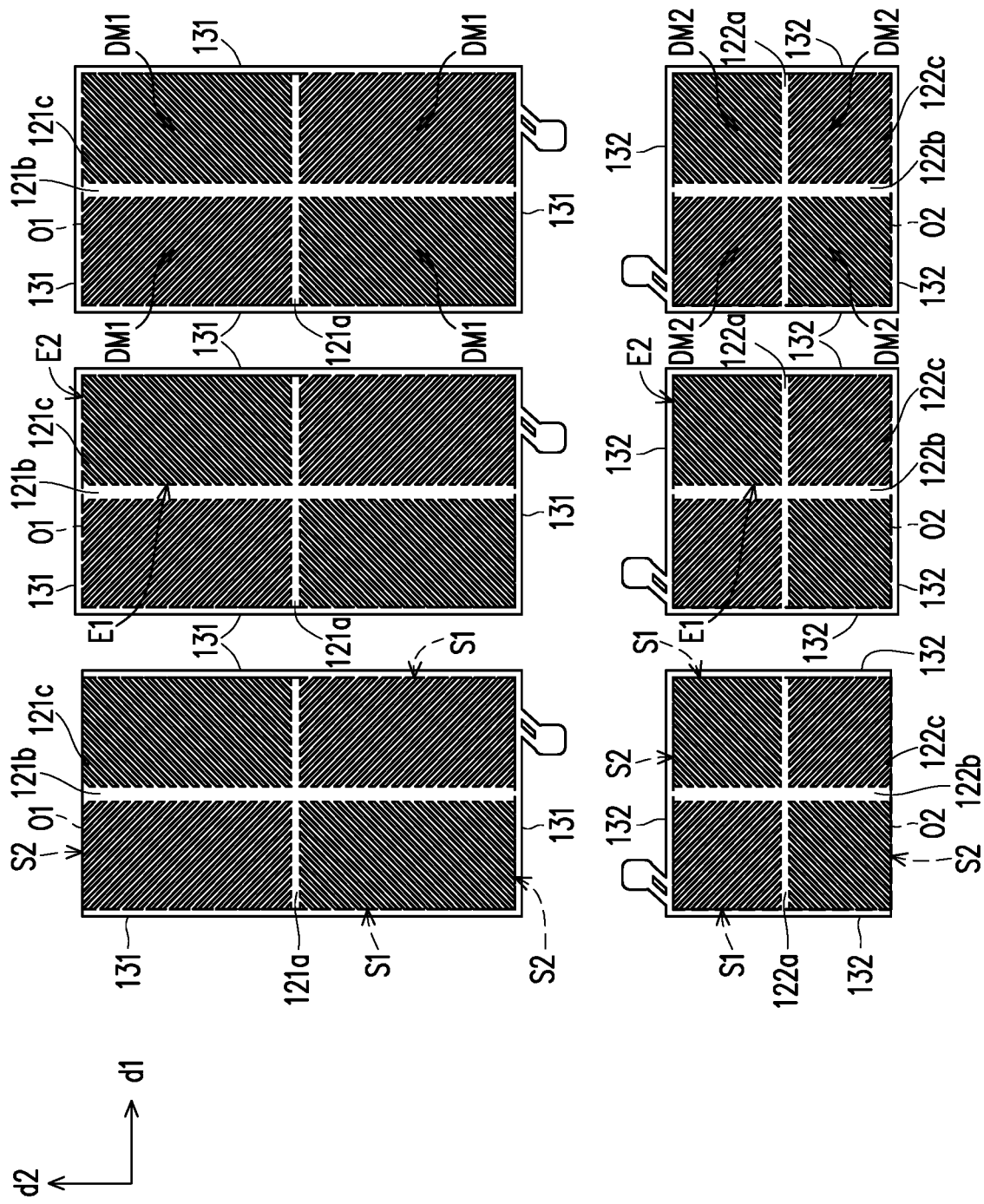
FIG. 4B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 4A.

FIG. 4A is a schematic top view of a pixel structure PX according to a third embodiment of the disclosure. FIG. 4B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 4A.

The pixel structure PX-3 of FIG. 4A is similar to the pixel structure PX-1 of FIG. 2A except that the first connecting electrode 131 and the second connecting electrode 132 of the pixel structure PX-3 and the first connecting electrode 131 and the second connecting electrode 132 of the pixel structure PX-1 are provided at different locations.

Referring to FIG. 4A and FIG. 4B, specifically, in the present embodiment, the first sides S1 of the first outline O1 of the first sub-pixel SPX-1 are provided with the first connecting electrode 131, and at least one of the second sides S2 of the first outline O1 of the first sub-pixel SPX-1 is not provided with the first connecting electrode 131. The first sides S1 and the second sides S2 of the first outline O1 of the second sub-pixel SPX-2 are provided with the first connecting electrode 131. The first sides S1 and the second sides S2 of the first outline O1 of the third sub-pixel SPX-3 are provided with the first connecting electrode 131.

The first sides S1 of the second outline O2 of the first sub-pixel SPX-1 are provided with the second connecting electrode 132, and at least one of the second sides S2 of the second outline O2 of the first sub-pixel SPX-1 is not provided with the second connecting electrode 132. The first sides S1 and the second sides S2 of the second outline O2 of the second sub-pixel SPX-2 are provided with the second connecting electrode 132. The first sides S1 and the second sides S2 of the second outline O2 of the third sub-pixel SPX-3 are provided with the second connecting electrode 132.

In the present embodiment, the first ratio of the second sub-pixel SPX-2 is substantially greater than the first ratio of the first sub-pixel SPX-1, and the first ratio of the second sub-pixel SPX-2 is substantially equal to the first ratio of the third sub-pixel SPX-3. The second ratio of the second sub-pixel SPX-2 is substantially greater than the second ratio of the first sub-pixel SPX-1, and the second ratio of the second sub-pixel SPX-2 is substantially equal to the second ratio of the third sub-pixel SPX-3.

Figure 5A:
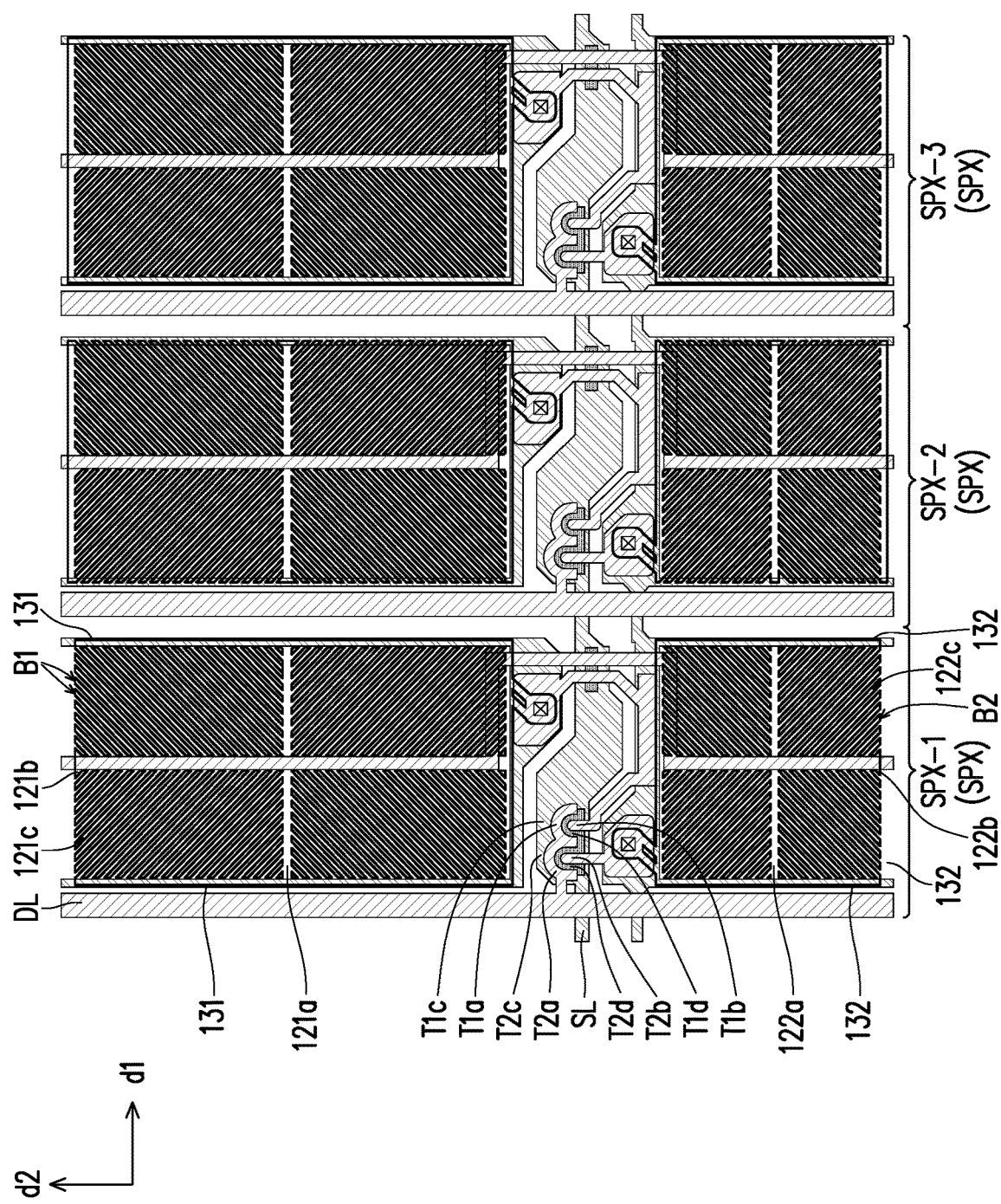
FIG. 5A is a schematic top view of a pixel structure PX according to a fourth embodiment of the disclosure.
Figure 5B:
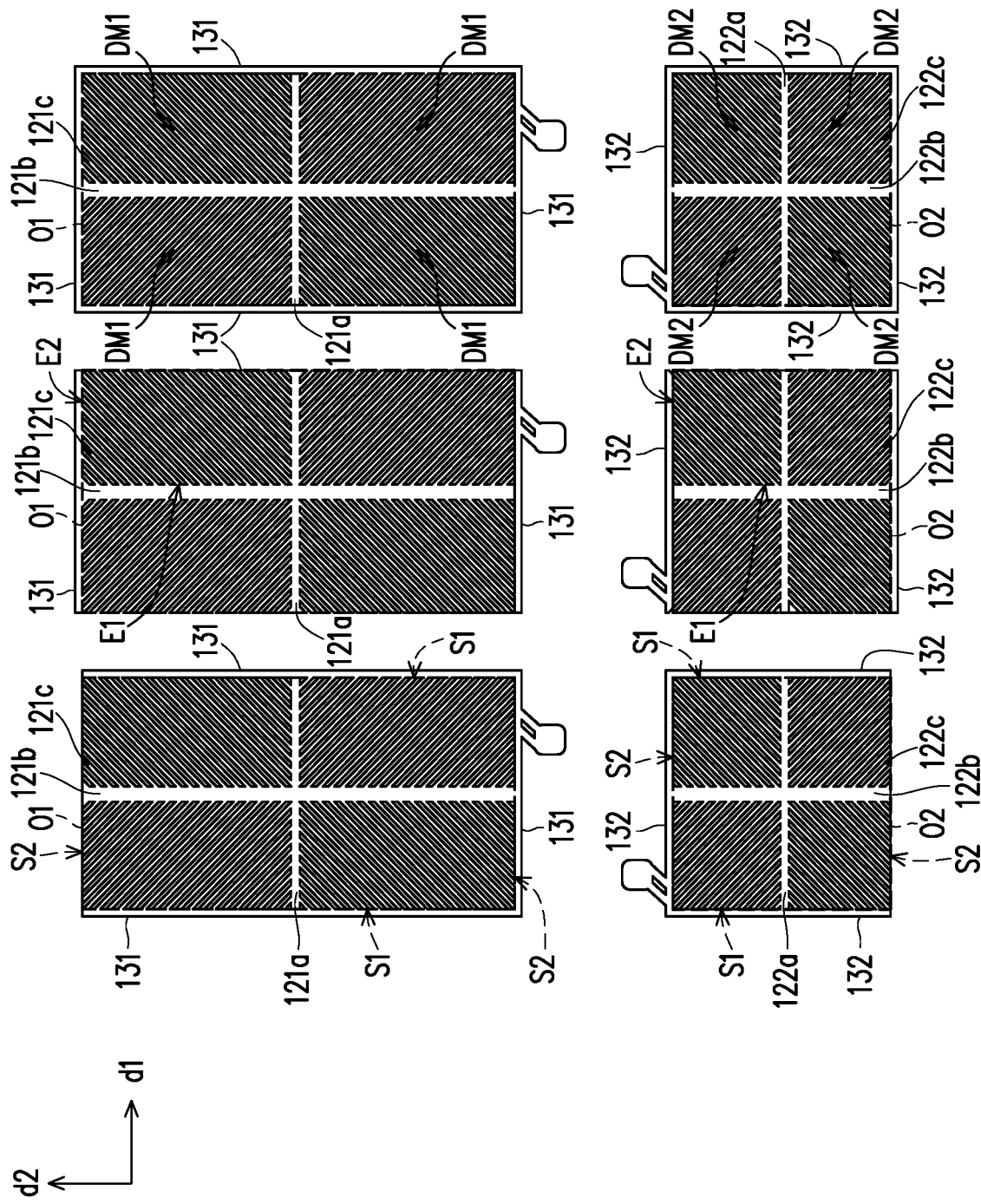
FIG. 5B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 5A.

FIG. 5A is a schematic top view of a pixel structure PX according to a fourth embodiment of the disclosure. FIG. 5B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 5A.

The pixel structure PX-4 of FIG. 5A is similar to the pixel structure PX-1 of FIG. 2A except that the first connecting electrode 131 and the second connecting electrode 132 of the pixel structure PX-4 and the first connecting electrode 131 and the second connecting electrode 132 of the pixel structure PX-1 are provided at different locations.

Referring to FIG. 5A and FIG. 5B, specifically, in the present embodiment, the first sides S1 of the first outline O1 of the first sub-pixel SPX-1 are provided with the first connecting electrode 131, and at least one of the second sides S2 of the first outline O1 of the first sub-pixel SPX-1 is not provided with the first connecting electrode 131. The first sides S1 of the first outline O1 of the second sub-pixel SPX-2 are not provided with the first connecting electrode 131, and the second sides S2 of the first outline O1 of the second sub-pixel SPX-2 are provided with the first connecting electrode 131. The first sides S1 and the second sides S2 of the first outline O1 of the third sub-pixel are provided with the first connecting electrode 131.

The first sides S1 of the second outline O2 of the first sub-pixel SPX-1 are provided with the second connecting electrode 132, and at least one of the second sides S2 of the second outline O2 of the first sub-pixel SPX-1 is not provided with the second connecting electrode 132. The first sides S1 of the second outline O2 of the second sub-pixel SPX-2 are not provided with the second connecting electrode 132, and the second sides S2 of the second outline O2 of the second sub-pixel SPX-2 are provided with the second connecting electrode 132. The first sides S1 and the second sides S2 of the second outline O2 of the third sub-pixel are provided with the second connecting electrode 132.

In the present embodiment, the first ratio of the third sub-pixel SPX-3 is substantially greater than the first ratio of the first sub-pixel SPX-1, and the first ratio of the first sub-pixel SPX-1 is substantially greater than the first ratio of the second sub-pixel SPX-2. The second ratio of the third sub-pixel SPX-3 is substantially greater than the second ratio of the first sub-pixel SPX-1, and the second ratio of the first sub-pixel SPX-1 is substantially greater than the second ratio of the second sub-pixel SPX-2.

Figure 6A:
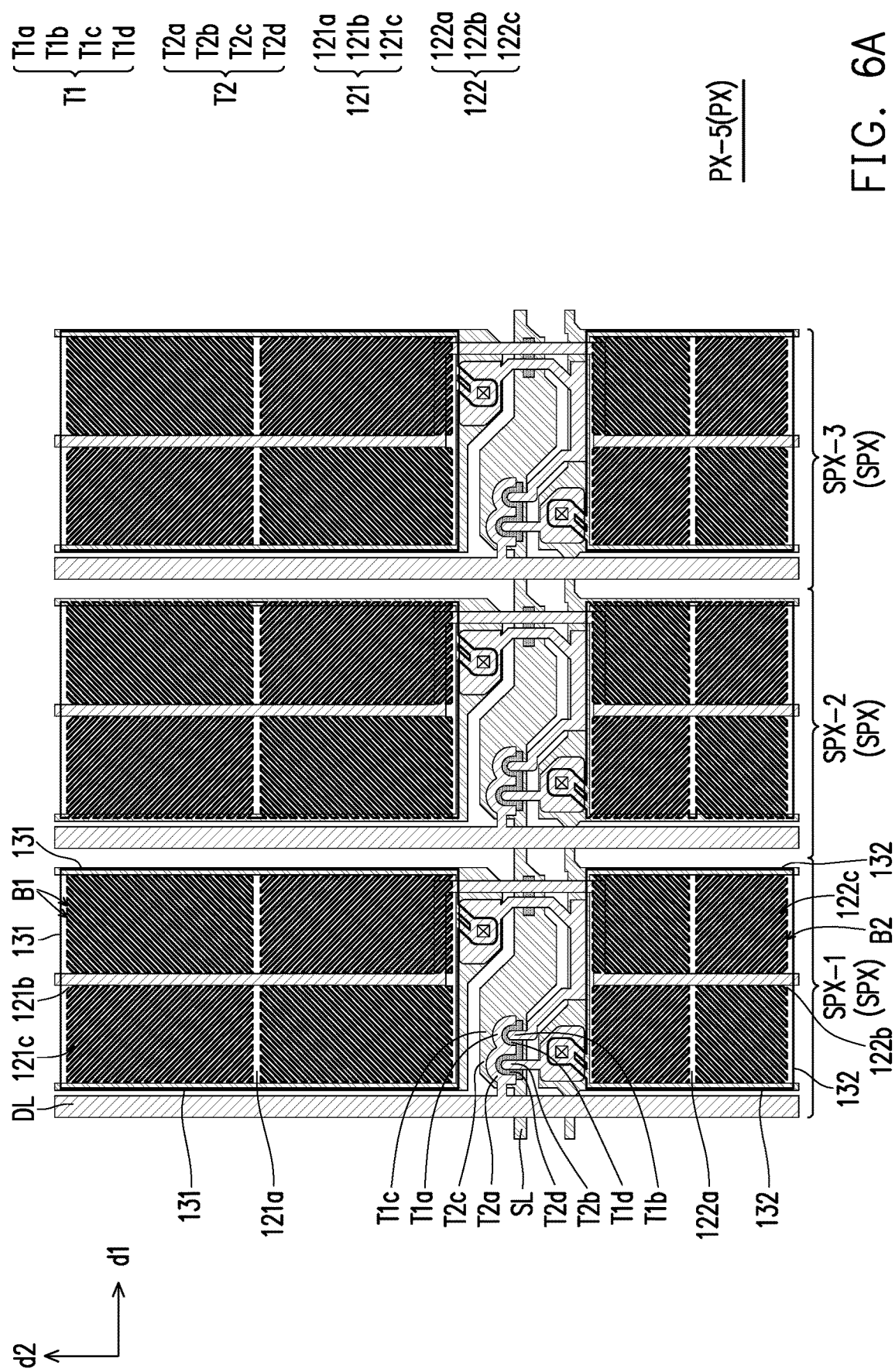
FIG. 6A is a schematic top view of a pixel structure PX according to a fifth embodiment of the disclosure.
Figure 6B:
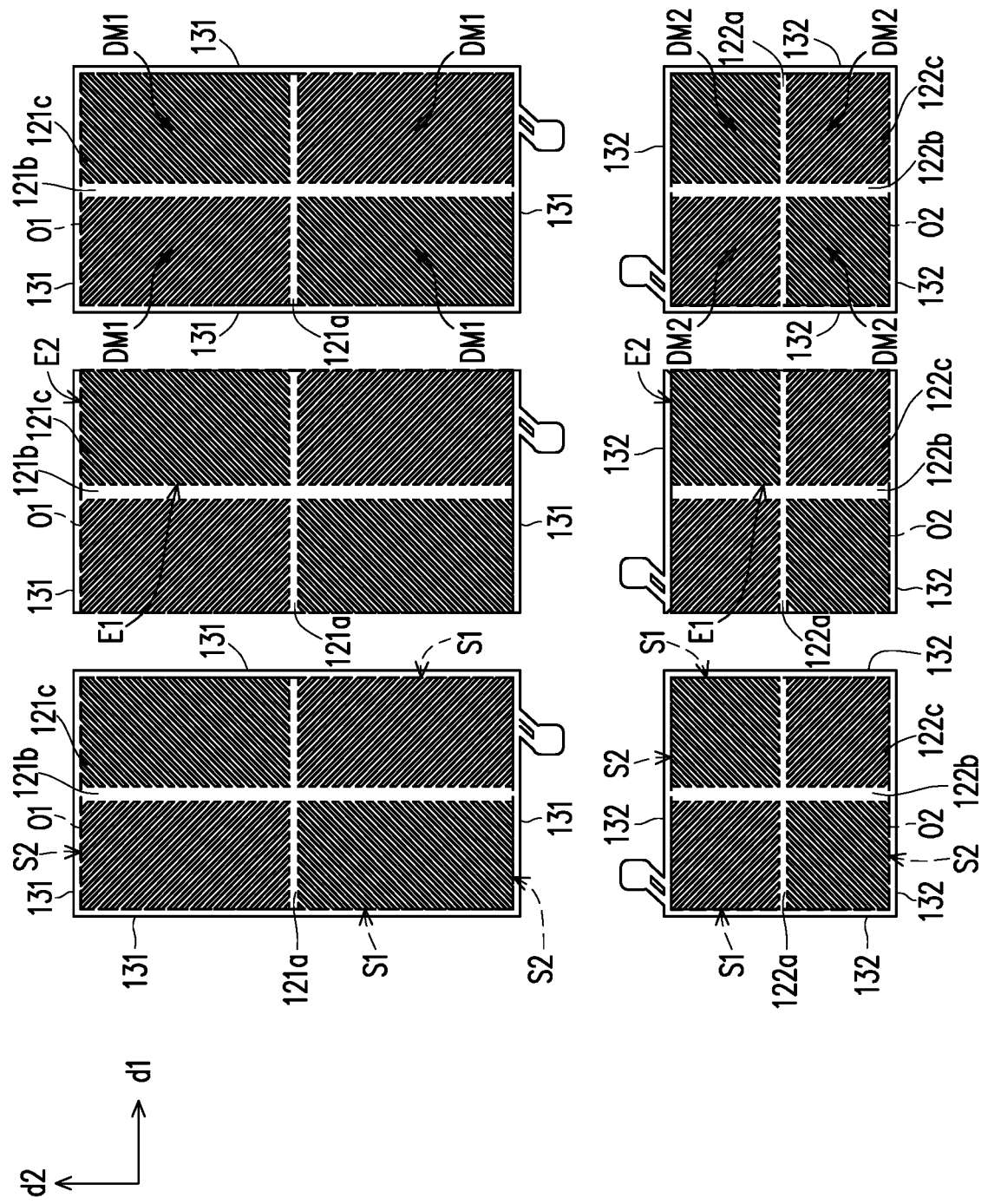
FIG. 6B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 6A.

FIG. 6A is a schematic top view of a pixel structure PX according to a fifth embodiment of the disclosure. FIG. 6B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 6A.

The pixel structure PX-5 of FIG. 6A is similar to the pixel structure PX-1 of FIG. 2A except that the first connecting electrode 131 and the second connecting electrode 132 of the pixel structure PX-5 and the first connecting electrode 131 and the second connecting electrode 132 of the pixel structure PX-1 are provided at different locations.

Referring to FIG. 6A and FIG. 6B, specifically, in the present embodiment, the first sides S1 and the second sides S2 of the first outline O1 of the first sub-pixel SPX-1 are provided with the first connecting electrode 131. The first sides S1 of the first outline O1 of the second sub-pixel SPX-2 are not provided with the first connecting electrode 131, and the second sides S2 of the first outline O1 of the second sub-pixel SPX-2 are provided with the first connecting electrode 131. The first sides S1 and the second sides S2 of the first outline O1 of the third sub-pixel SPX-3 are provided with the first connecting electrode 131.

The first sides S1 and the second sides S2 of the second outline O2 of the first sub-pixel SPX-1 are provided with the second connecting electrode 132. The first sides S1 of the second outline O2 of the second sub-pixel SPX-2 are not provided with the second connecting electrode 132, and the second sides S2 of the second outline O2 of the second sub-pixel SPX-2 are provided with the second connecting electrode 132. The first sides S1 and the second sides S2 of the second outline O2 of the third sub-pixel SPX-3 are provided with the second connecting electrode 132.

In the present embodiment, the first ratio of the first sub-pixel SPX-1 is substantially greater than the first ratio of the second sub-pixel SPX-2, and the first ratio of the first sub-pixel SPX-1 is substantially equal to the first ratio of the third sub-pixel SPX-3. The second ratio of the first sub-pixel SPX-1 is substantially greater than the second ratio of the second sub-pixel SPX-2, and the second ratio of the first sub-pixel SPX-1 is substantially equal to the second ratio of the third sub-pixel SPX-3.

Figure 7A:
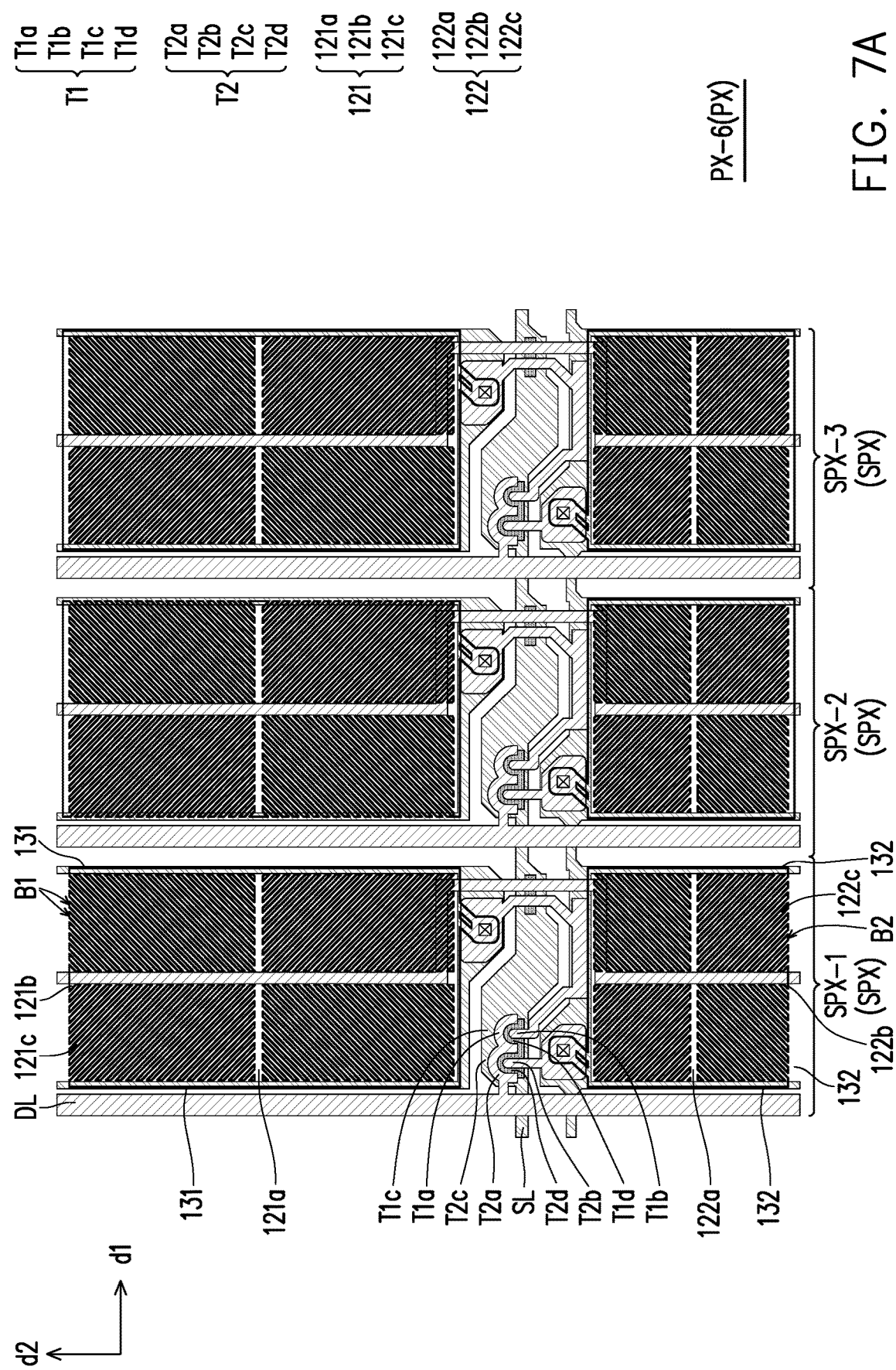
FIG. 7A is a schematic top view of a pixel structure PX according to a sixth embodiment of the disclosure.
Figure 7B:
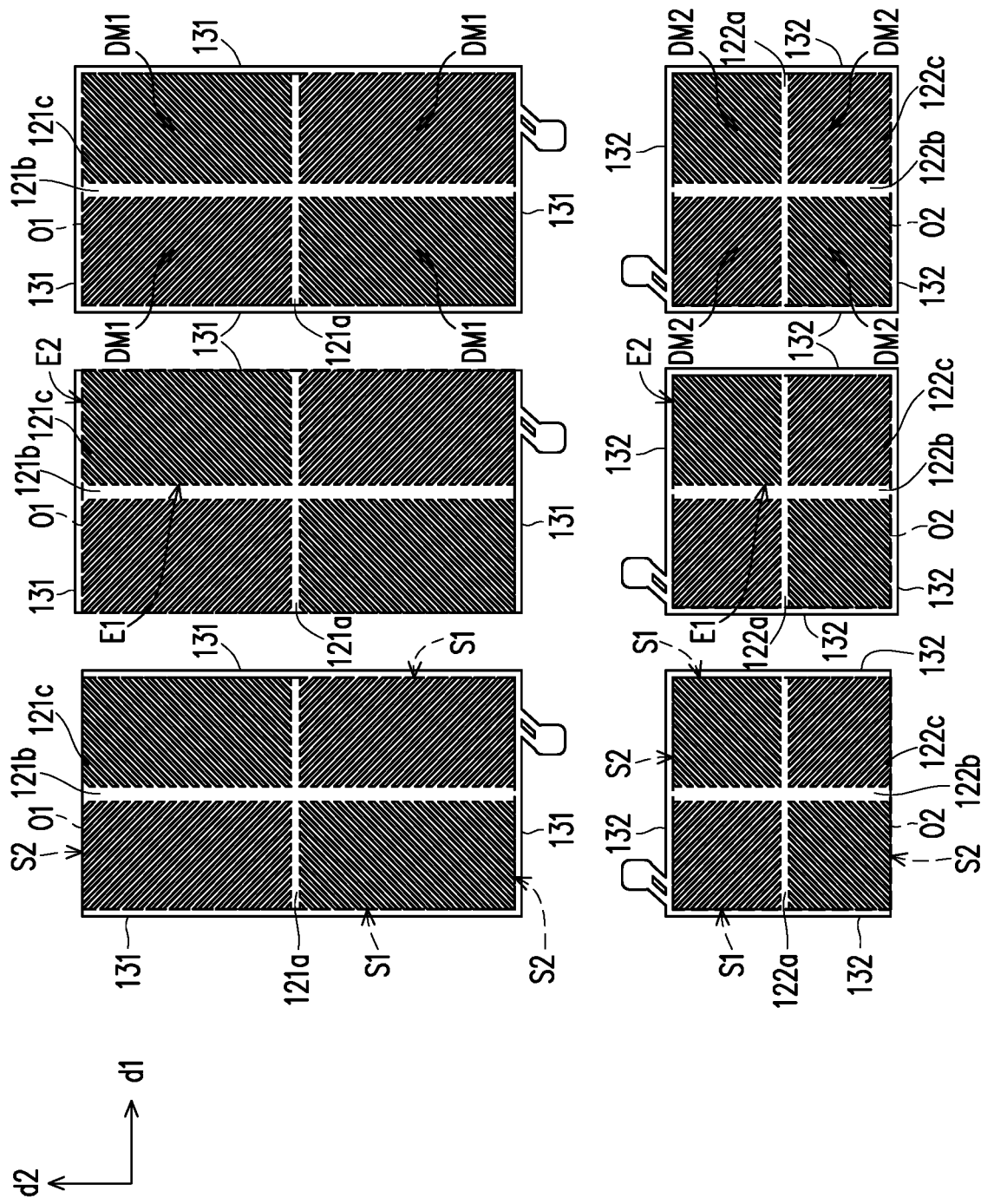
FIG. 7B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 7A.

FIG. 7A is a schematic top view of a pixel structure PX according to a sixth embodiment of the disclosure. FIG. 7B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 7A.

The pixel structure PX-6 of FIG. 7A is similar to the pixel structure PX-4 of FIG. 5A except that the first sides S1 of the second outline O2 of the second sub-pixel SPX-2 of the pixel structure PX-6 are provided with the second connecting electrode 132. In the present embodiment, the first ratio of the second sub-pixel SPX-2 is substantially different from the second ratio of the second sub-pixel SPX-2.

Figure 8A:
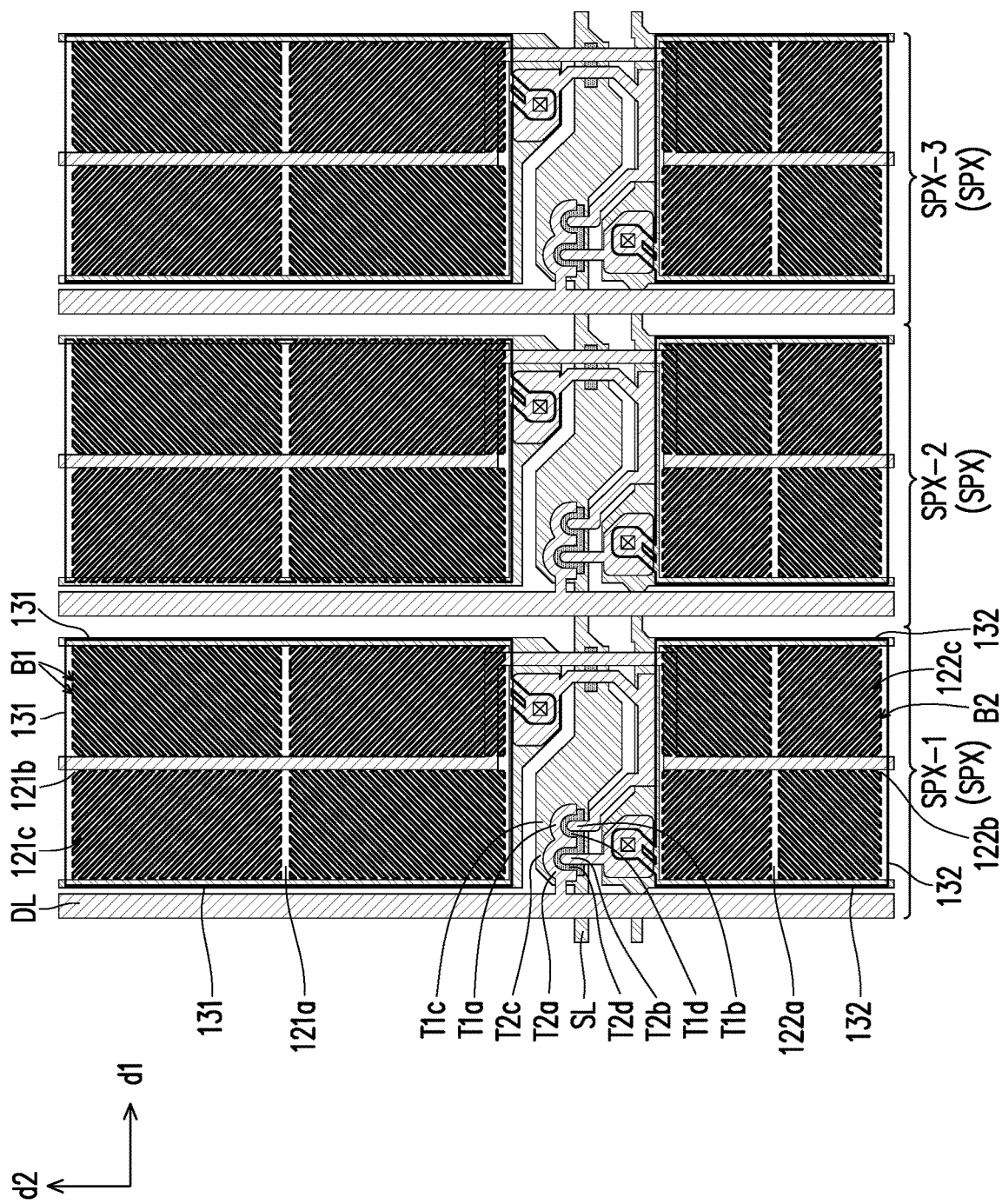
FIG. 8A is a schematic top view of a pixel structure PX according to a seventh embodiment of the disclosure.
Figure 8B:
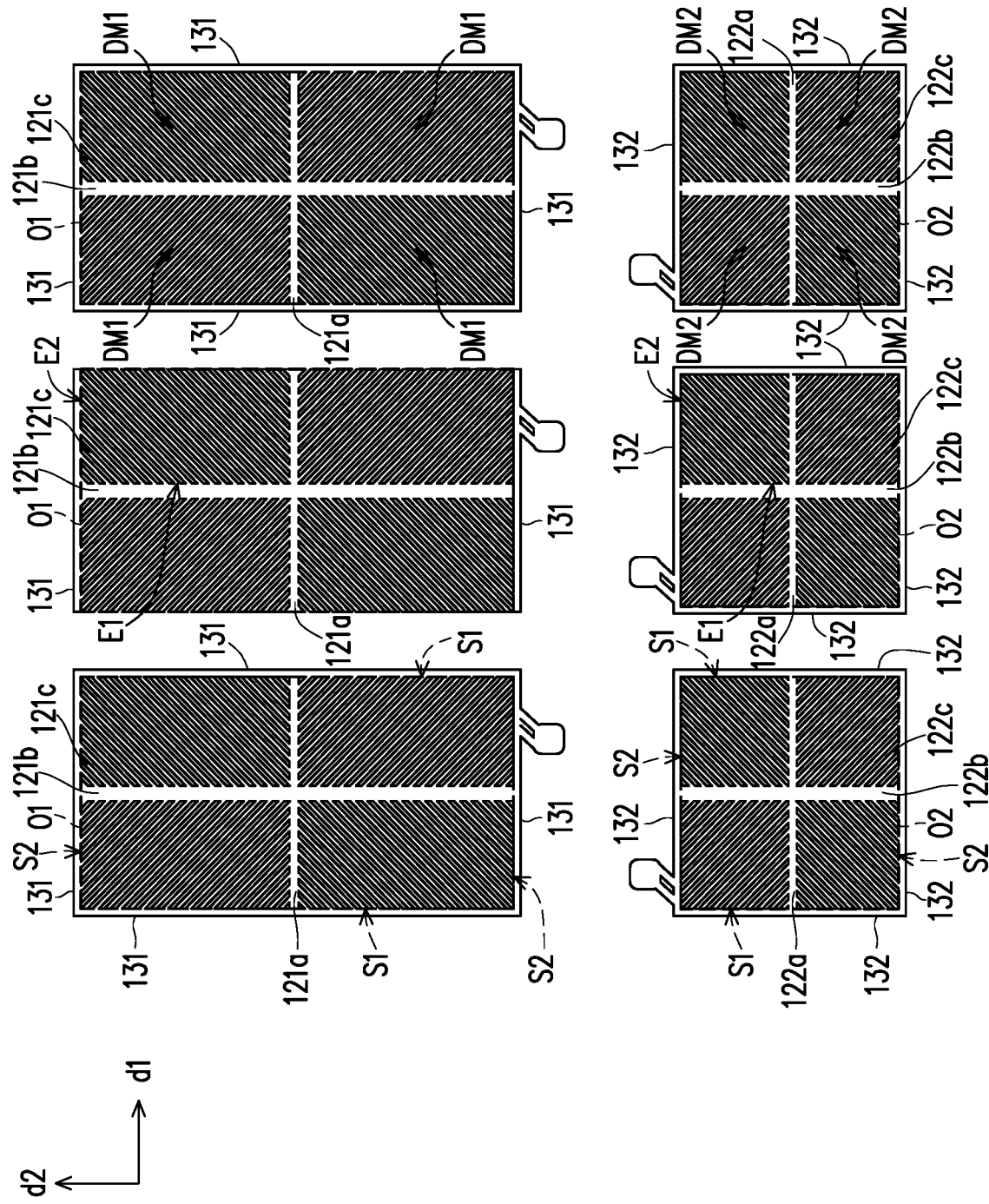
FIG. 8B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 8A.

FIG. 8A is a schematic top view of a pixel structure PX according to a seventh embodiment of the disclosure. FIG. 8B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 8A.

The pixel structure PX-7 of FIG. 8A is similar to the pixel structure PX-5 of FIG. 6A except that the first sides S1 of the second outline O2 of the second sub-pixel SPX-2 of the pixel structure PX-7 are provided with the second connecting electrode 132. In the present embodiment, the first ratio of the second sub-pixel SPX-2 is substantially different from the second ratio of the second sub-pixel SPX-2.

Figure 9A:
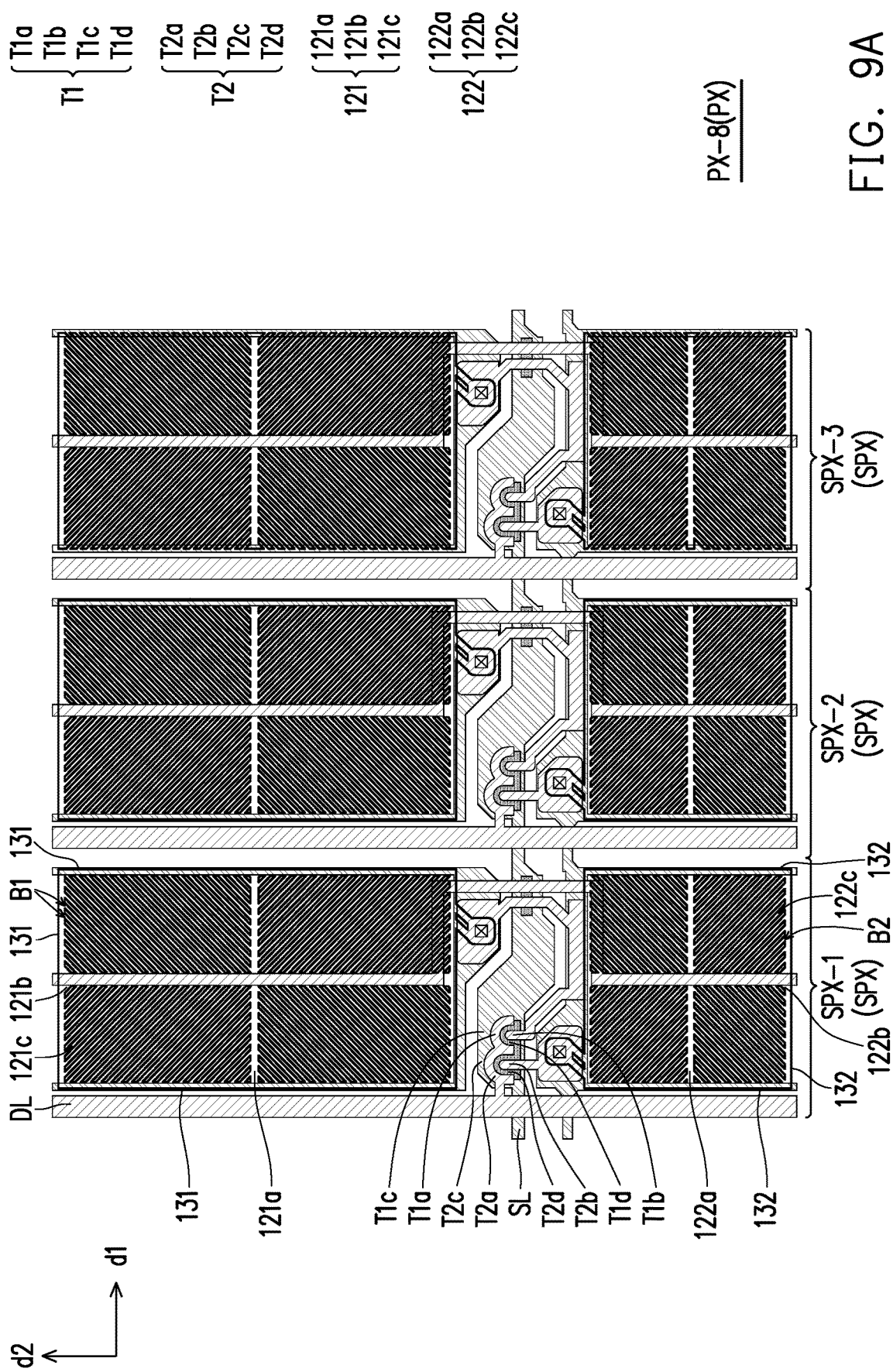
FIG. 9A is a schematic top view of a pixel structure PX according to an eighth embodiment of the disclosure.
Figure 9B:
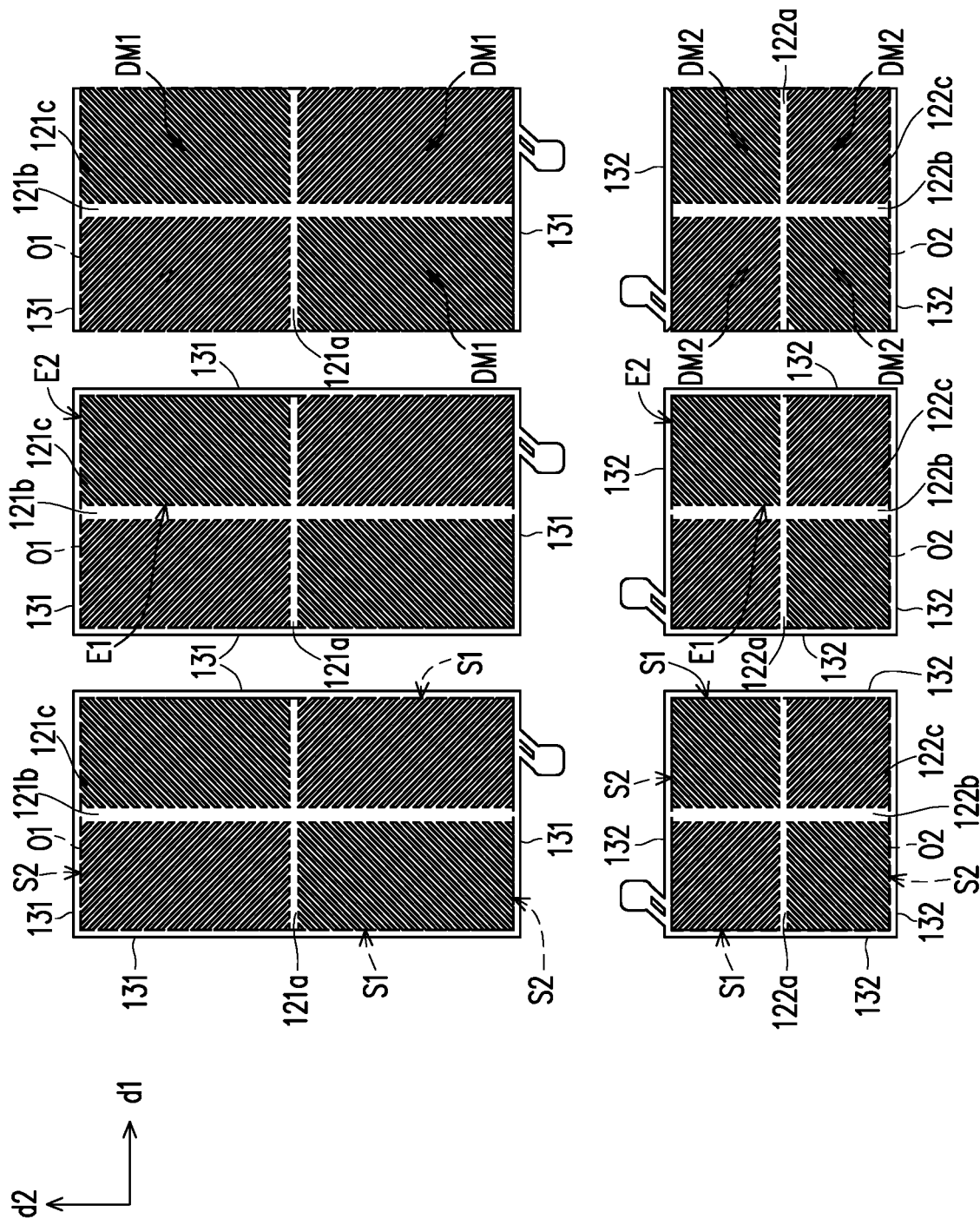
FIG. 9B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 9A.

FIG. 9A is a schematic top view of a pixel structure PX according to an eighth embodiment of the disclosure. FIG. 9B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 9A.

The pixel structure PX-8 of FIG. 9A is similar to the pixel structure PX-1 of FIG. 2A except that the first connecting electrode 131 and the second connecting electrode 132 of the pixel structure PX-8 and the first connecting electrode 131 and the second connecting electrode 132 of the pixel structure PX-1 are provided at different locations.

Referring to FIG. 9A and FIG. 9B, specifically, in the present embodiment, the first sides S1 and the second sides S2 of the first outline O1 of the first sub-pixel SPX-1 are provided with the first connecting electrode 131. The first sides S1 and the second sides S2 of the first outline O1 of the second sub-pixel SPX-2 are provided with the first connecting electrode 131. The first sides S1 of the first outline O1 of the third sub-pixel SPX-3 are not provided with the first connecting electrode 131, and the second sides S2 of the first outline O1 of the third sub-pixel SPX-3 are provided with the first connecting electrode 131.

The first sides S1 and the second sides S2 of the second outline O2 of the first sub-pixel SPX-1 are provided with the second connecting electrode 132. The first sides S1 and the second sides S2 of the second outline O2 of the second sub-pixel SPX-2 are provided with the second connecting electrode 132. The first sides S1 of the second outline O2 of the third sub-pixel SPX-3 are not provided with the second connecting electrode 132, and the second sides S2 of the second outline O2 of the third sub-pixel SPX-3 are provided with the second connecting electrode 132.

In the present embodiment, the first ratio of the first sub-pixel SPX-1 is substantially greater than the first ratio of the third sub-pixel SPX-3, and the first ratio of the first sub-pixel SPX-1 is substantially equal to the first ratio of the second sub-pixel SPX-2. The second ratio of the first sub-pixel SPX-1 is substantially greater than the second ratio of the third sub-pixel SPX-3, and the second ratio of the first sub-pixel SPX-1 is substantially equal to the second ratio of the second sub-pixel SPX-2.

Figure 10A:
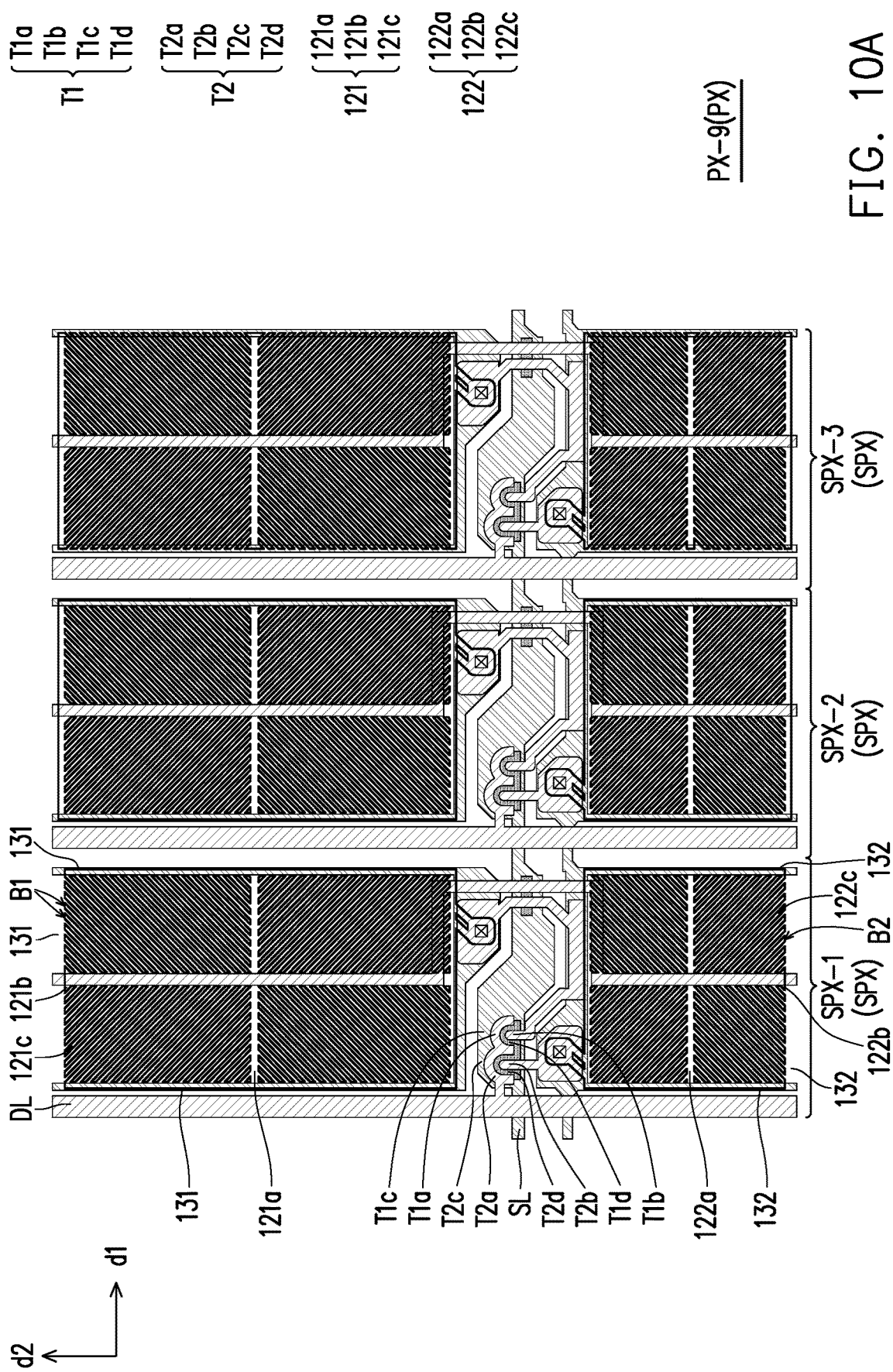
FIG. 10A is a schematic top view of a pixel structure PX according to a ninth embodiment of the disclosure.
Figure 10B:
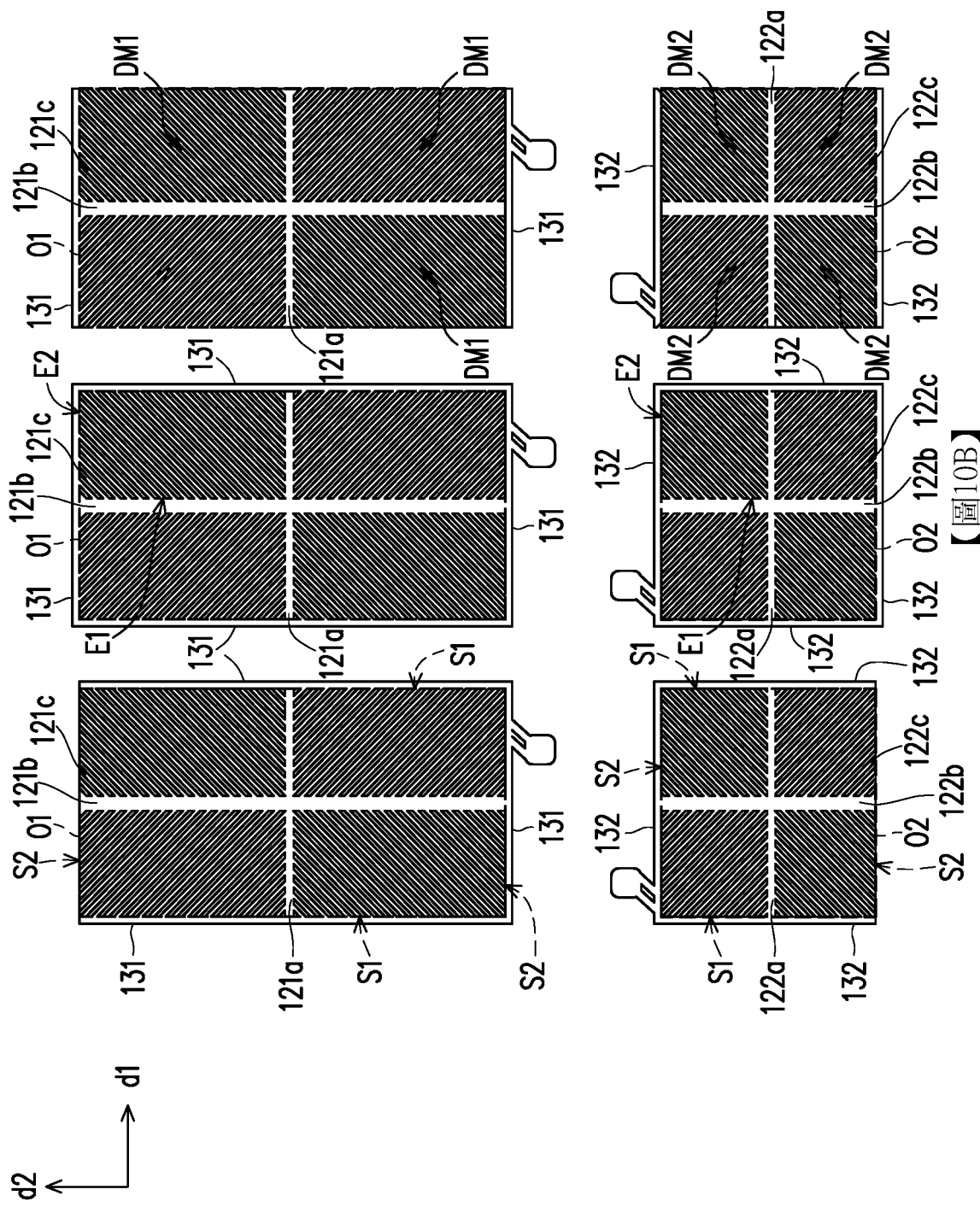
FIG. 10B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 10A.

FIG. 10A is a schematic top view of a pixel structure PX according to a ninth embodiment of the disclosure. FIG. 10B shows a plurality of first pixel electrodes 121, a plurality of second pixel electrodes 122, a plurality of first outlines O1, a plurality of second outlines O2, a plurality of first connecting electrodes 131, and a plurality of second connecting electrodes 132 of the pixel structure PX of FIG. 10A.

The pixel structure PX-9 of FIG. 10A is similar to the pixel structure PX-1 of FIG. 2A except that the first connecting electrode 131 and the second connecting electrode 132 of the pixel structure PX-9 and the first connecting electrode 131 and the second connecting electrode 132 of the pixel structure PX-1 are provided at different locations.

Referring to FIG. 10A and FIG. 10B, specifically, in the present embodiment, the first sides S1 of the first outline O1 of the first sub-pixel SPX-1 are provided with the first connecting electrode 131, and at least one of the second sides S2 of the first outline O1 of the first sub-pixel SPX-1 is not provided with the first connecting electrode 131. The first sides S1 and the second sides S2 of the first outline O1 of the second sub-pixel SPX-2 are provided with the first connecting electrode 131. The first sides S1 of the first outline O1 of the third sub-pixel SPX-3 are not provided with the first connecting electrode 131, and the second sides S2 of the first outline O1 of the third sub-pixel SPX-3 are provided with the first connecting electrode 131.

The first sides S1 of the second outline O2 of the first sub-pixel SPX-1 are provided with the second connecting electrode 132, and at least one of the second sides S2 of the second outline O2 of the first sub-pixel SPX-1 is not provided with the second connecting electrode 132. The first sides S1 and the second sides S2 of the second outline O2 of the second sub-pixel SPX-2 are provided with the second connecting electrode 132. The first sides S1 of the second outline O2 of the third sub-pixel SPX-3 are not provided with the second connecting electrode 132, and the second sides S2 of the second outline O2 of the third sub-pixel SPX-3 are provided with the second connecting electrode 132.

Figure 11B:
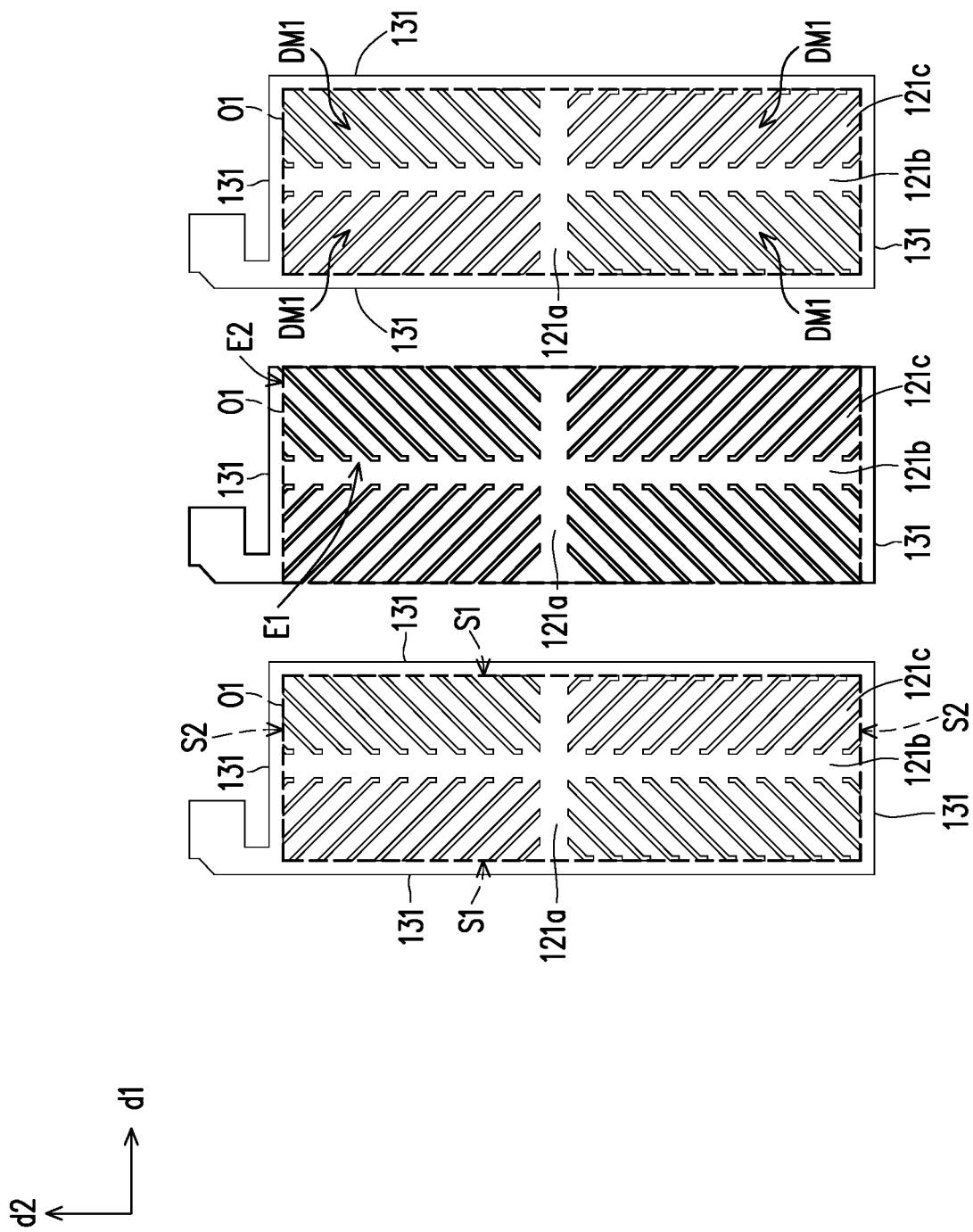
FIG. 11B shows a plurality of first pixel electrodes 121, a plurality of first outlines O1, and a plurality of first connecting electrodes 131 of the pixel structure PX of FIG. 11A.

FIG. 11A is a schematic top view of a pixel structure PX according to a tenth embodiment of the disclosure. FIG. 11B shows a plurality of first pixel electrodes 121, a plurality of first outlines O1, and a plurality of first connecting electrodes 131 of the pixel structure PX of FIG. 11A.

The pixel structure PX-10 of FIG. 11A is similar to the pixel structure PX-5 of FIG. 6A except that each of the sub-pixels SPX' of the pixel structure PX-10 is different from each of the sub-pixels SPX of the pixel structure PX-5.

Referring to FIG. 11A and FIG. 11B, specifically, in the present embodiment, each of the sub-pixels SPX' of the pixel structure PX-10 may not include a second thin film transistor T2 and a second pixel electrode 122. That is to say, each of the sub-pixels SPX' of the pixel structure PX-10 has four alignment areas (i.e., four first alignment areas DM1), different from that each of the sub-pixels SPX' of the pixel structure PX-5 has eight alignment areas (i.e., four first alignment areas DM1 and four second alignment areas DM2). In addition, in the present embodiment, the pixel structure PX-10 may not include the second connecting electrode 132.

Figure 12A:
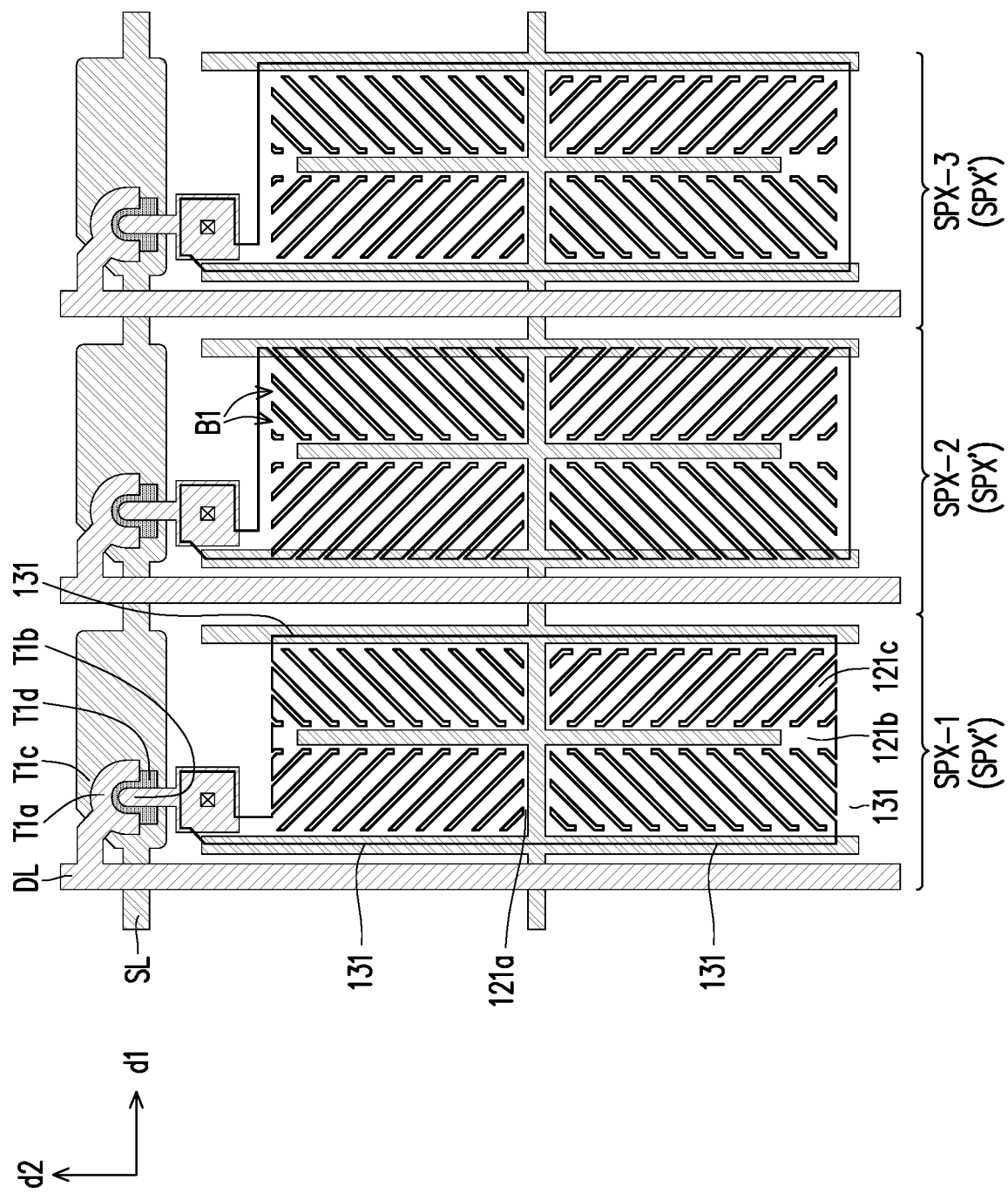
FIG. 12A is a schematic top view of a pixel structure PX according to an eleventh embodiment of the disclosure.
Figure 12B:
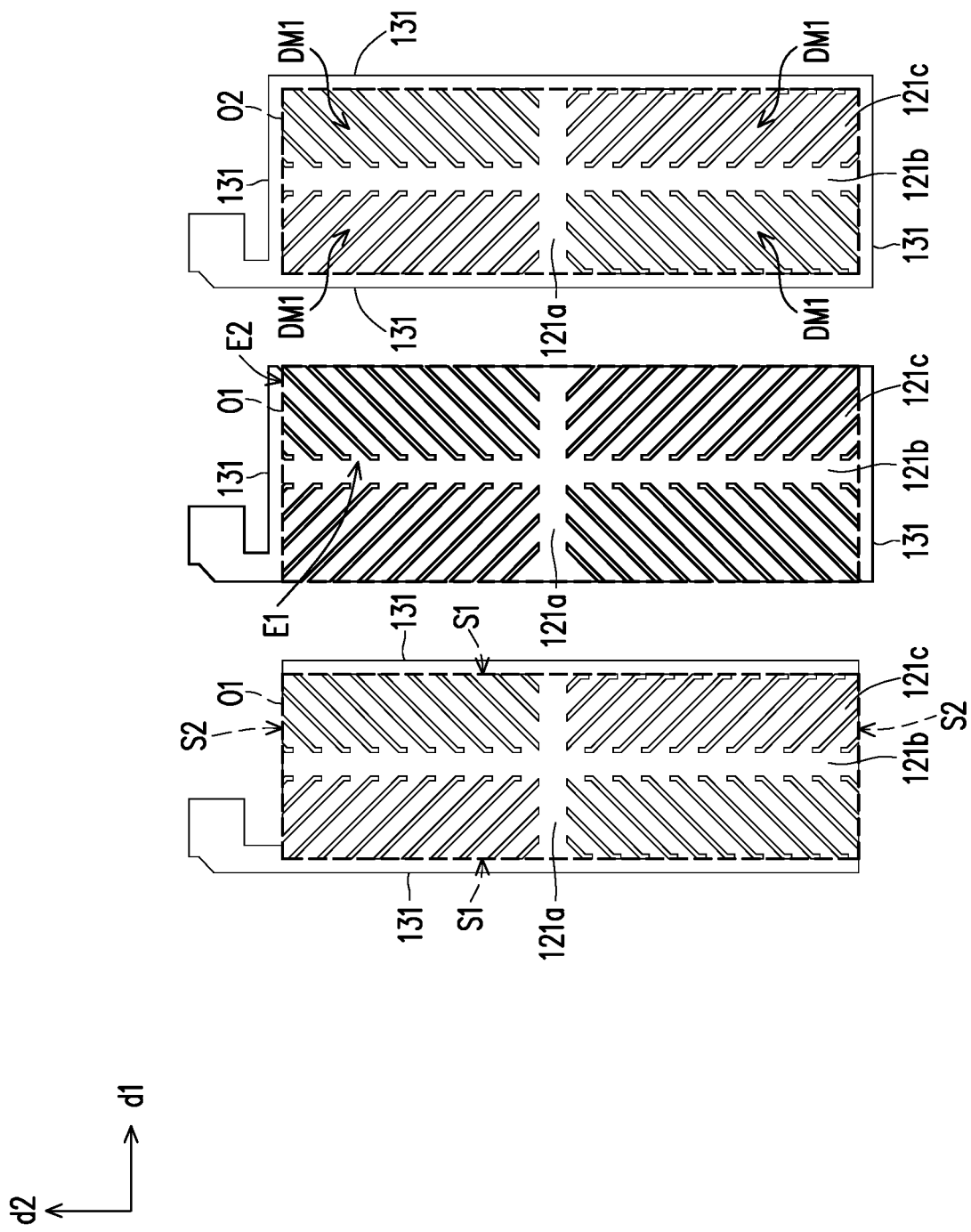
FIG. 12B shows a plurality of first pixel electrodes 121, a plurality of first outlines O1, and a plurality of first connecting electrodes 131 of the pixel structure PX of FIG. 12A.

FIG. 12A is a schematic top view of a pixel structure PX according to an eleventh embodiment of the disclosure. FIG. 12B shows a plurality of first pixel electrodes 121, a plurality of first outlines O1, and a plurality of first connecting electrodes 131 of the pixel structure PX of FIG. 12A.

The pixel structure PX-11 of FIG. 12A is similar to the pixel structure PX-4 of FIG. 5A except that each of the sub-pixels SPX' of the pixel structure PX-11 is different from each of the sub-pixels SPX of the pixel structure PX-4.

Referring to FIG. 12A and FIG. 12B, specifically, in the present embodiment, each of the sub-pixels SPX' of the pixel structure PX-11 may not include a second thin film transistor T2 and a second pixel electrode 122. That is to say, each of the sub-pixels SPX' of the pixel structure PX-11 has four alignment areas (i.e., four first alignment areas DM1), different from that each of the sub-pixels SPX' of the pixel structure PX-4 has eight alignment areas (i.e., four first alignment areas DM1 and four second alignment areas DM2). In addition, in the present embodiment, the two second sides S2 of the first outline O1 of the first sub-pixel SPX-1 of the pixel structure PX-11 may be not provided with the first connecting electrode 131 respectively.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pixel structure adapted to a display device, the display device being formed by sandwiching a liquid crystal layer between a first substrate and a second substrate, the pixel structure comprising:
a first sub-pixel, a second sub-pixel, and a third sub-pixel;
a plurality of first pixel electrodes, formed in the first sub-pixel, the second sub-pixel, and the third sub-pixel respectively to control an alignment direction of a plurality of liquid crystal molecules of the liquid crystal layer, each of the first pixel electrodes comprising a plurality of first branch portions, each of the first pixel electrodes comprising a first outline, the first outline being located at a plurality of endpoints of the first branch portions, and the first outline comprising at least four sides; and
a plurality of first connecting electrodes, formed in the first sub-pixel, the second sub-pixel, and the third sub-pixel, respectively, and disposed on at least one portion of the first outlines of the first pixel electrodes, wherein the first branch portions of each of the first pixel electrodes and one of the first connecting electrodes have a first junction, the first junction is located on the first outline, the first junction has a length, the first outline has a length, and each of the first sub-pixel, the second sub-pixel, and the third sub-pixel has a first ratio of the length of the first junction to the length of the first outline; and the first ratios of at least two of the first sub-pixel, the second sub-pixel, and the third sub-pixel being substantially different, wherein the first ratio of the first sub-pixel is substantially greater than the first ratio of the second sub-pixel, and the first ratio of the second sub-pixel is substantially greater than the first ratio of the third sub-pixel.

2. The pixel structure according to claim 1, wherein the first ratio of the first sub-pixel and the first ratio of the second sub-pixel has a difference $\Delta R1$, and $10\% \leq \Delta R1 \leq 75\%$.

3. The pixel structure according to claim 1, wherein each of the first pixel electrodes further comprises a plurality of first trunk portions crossing each other, the first trunk portions define a plurality of first alignment areas, the first branch portions are disposed in the first alignment areas, respectively, each of the first branch portions comprises a first endpoint and a second endpoint opposite to each other, the first endpoint is connected to at least one of the first trunk portions, and the first outline is located at the second endpoints of the first branch portions.

4. The pixel structure according to claim 1, wherein the at least four sides of the first outline comprise a plurality of first sides arranged in a first direction and a plurality of second sides arranged in a second direction, one of the first connecting electrodes is disposed on the first sides and the second sides of the first sub-pixel, one of the first connecting electrodes is disposed on the first sides and the second sides of the second sub-pixel, and one of the first connecting electrodes is disposed on the first sides of the third sub-pixel, and none of the first connecting electrodes are disposed on the second sides of the third sub-pixel.

5. The pixel structure according to claim 1, wherein the at least four sides of the first outline comprise a plurality of first sides arranged in a first direction and a plurality of second sides arranged in a second direction, one of the first connecting electrodes is disposed on the first sides of the first sub-pixel, none of the first connecting electrodes are disposed on at least one of the second sides of the first sub-pixel, one of the first connecting electrodes is disposed on the first sides and the second sides of the second sub-pixel, and one of the first connecting electrodes is disposed on the first sides and the second sides of the third sub-pixel.

6. The pixel structure according to claim 1, wherein the at least four sides of the first outline comprise a plurality of first sides arranged in a first direction and a plurality of second sides arranged in a second direction, one of the first connecting electrodes is disposed on the first sides of the first sub-pixel, none of the first connecting electrodes are disposed on at least one of the second sides of the first sub-pixel, none of the first connecting electrodes are disposed on the first sides of the second sub-pixel, one of the first connecting electrodes is disposed on the second sides of the second sub-pixel, and one of the first connecting electrodes is disposed on the first sides and the second sides of the third sub-pixel.

7. The pixel structure according to claim 1, wherein the at least four sides of the first outline comprise a plurality of first sides arranged in a first direction and a plurality of second sides arranged in a second direction, one of the first connecting electrodes is disposed on the first sides of the first sub-pixel, none of the first connecting electrodes are disposed on at least one of the second sides of the first sub-pixel, none of the first connecting electrodes are disposed on the first sides of the second sub-pixel, one of the first connecting electrodes is disposed on the second sides of the second sub-pixel, none of the first connecting electrodes are disposed on the first sides of the third sub-pixel, and one of the first connecting electrodes is disposed on the second sides of the third sub-pixel.

8. The pixel structure according to claim 1, wherein the at least four sides of the first outline comprise a plurality of first sides arranged in a first direction and a plurality of second sides arranged in a second direction; one of the first connecting electrodes is disposed on the first sides and the second sides of the first sub-pixel, none of the first connecting electrodes are disposed on the first sides of the second sub-pixel, one of the first connecting electrodes is disposed on the second sides of the second sub-pixel, none of the first connecting electrodes are disposed on the first sides of the third sub-pixel, and one of the first connecting electrodes is disposed on the second sides of the third sub-pixel.

9. The pixel structure according to claim 1, wherein the at least four sides of the first outline comprise a plurality of first sides arranged in a first direction and a plurality of second sides arranged in a second direction, one of the first connecting electrodes is disposed on the first sides of the first sub-pixel, none of the first connecting electrodes are disposed at least one of the second sides of the first sub-pixel, one of the first connecting electrodes is disposed on the first sides and the second sides of the second sub-pixel, none of the first connecting electrodes are disposed on the first sides of the third sub-pixel, and one of the first connecting electrodes is disposed on the second sides of the third sub-pixel.

10. The pixel structure according to claim 1, further comprising:

a plurality of second pixel electrodes, structurally separated from the first pixel electrodes, the second pixel electrodes being formed in the first sub-pixel, the second sub-pixel, and the third sub-pixel respectively to control the alignment direction of the liquid crystal molecules of the liquid crystal layer, each of the second pixel electrodes comprising a plurality of second branch portions, each of the second pixel electrodes having a second outline, the second outline being located at a plurality of endpoints of the second branch portions, and the second outline comprising at least four sides; and a plurality of second connecting electrodes, formed in the first sub-pixel, the second sub-pixel, and the third sub-pixel, respectively, and disposed on at least one portion of the second outlines of the second pixel electrodes, wherein the second branch portions of each of the second pixel electrodes and one of the second connecting electrodes have a second junction, the second junction is located on the second outline, the second junction has a length, the second outline has a length, and each of the first sub-pixel, the second sub-pixel, and the third sub-pixel has a second ratio of the length of the second junction to the length of the second outline; and the second ratios of at least two of the first sub-pixel, the second sub-pixel, and the third sub-pixel being substantially different.

11. The pixel structure according to claim 10, wherein the second ratio of the first sub-pixel and the second ratio of the second sub-pixel has a difference $\Delta R2$, and $10\% \leq \Delta R2 \leq 75\%$.

12. The pixel structure according to claim 10, wherein each of the second pixel electrodes further comprises a plurality of second trunk portions crossing each other, the second trunk portions define a plurality of second alignment areas, the second branch portions are disposed in the second alignment areas, respectively, each of the second branch portions comprises a first endpoint and a second endpoint opposite to each other, the first endpoint of each of the second branch portions is connected to at least one of the second trunk portions, and the second outline is located at the second endpoints of the second branch portions.

13. The pixel structure according to claim 10, wherein the second ratio of the first sub-pixel is substantially greater than the second ratio of the second sub-pixel, and the second ratio of the second sub-pixel is substantially greater than the second ratio of the third sub-pixel.

14. The pixel structure according to claim 10, wherein the second ratio of the first sub-pixel is substantially greater than the second ratio of the second sub-pixel, and the second ratio of the second sub-pixel is substantially equal to the second ratio of the third sub-pixel.

15. The pixel structure according to claim 10, wherein the first ratio of one of the first sub-pixel, the second sub-pixel, and the third sub-pixel is substantially different from the second ratio of the one of the first sub-pixel, the second sub-pixel, and the third sub-pixel.

16. The pixel structure according to claim 10, wherein the at least four sides of the second outline comprise a plurality of first sides arranged in a first direction and a plurality of second sides arranged in a second direction, one of the second connecting electrodes is disposed on the first sides and the second sides of the first sub-pixel, one of the second connecting electrodes is disposed on the first sides and the second sides of the second sub-pixel, and one of the second connecting electrodes is disposed on the first sides of the third sub-pixel, and none of the second connecting electrodes are disposed on the second sides of the third sub-pixel.

17. The pixel structure according to claim 10, wherein the at least four sides of the second outline comprise a plurality of first sides arranged in a first direction and a plurality of second sides arranged in a second direction, one of the second connecting electrodes is disposed on the first sides of the first sub-pixel, none of the second connecting electrodes are disposed on at least one of the second sides of the first sub-pixel, none of the second connecting electrodes are disposed on the first sides of the second sub-pixel, one of the second connecting electrodes is disposed on the second sides of the second sub-pixel, and one of the second connecting electrodes is disposed on the first sides and the second sides of the third sub-pixel.

18. A pixel structure adapted to a display device, the display device being formed by sandwiching a liquid crystal layer between a first substrate and a second substrate, the pixel structure comprising:
a first sub-pixel, a second sub-pixel, and a third sub-pixel;
a plurality of first pixel electrodes, formed in the first sub-pixel, the second sub-pixel, and the third sub-pixel respectively to control an alignment direction of a plurality of liquid crystal molecules of the liquid crystal layer, each of the first pixel electrodes comprising a plurality of first branch portions, each of the first pixel electrodes comprising a first outline, the first outline being located at a plurality of endpoints of the first branch portions, and the first outline comprising at least four sides; and
a plurality of first connecting electrodes, formed in the first sub-pixel, the second sub-pixel, and the third sub-pixel, respectively, and disposed on at least one portion of the first outlines of the first pixel electrodes,
wherein the first branch portions of each of the first pixel electrodes and one of the first connecting electrodes have a first junction, the first junction is located on the first outline, the first junction has a length, the first outline has a length, and each of the first sub-pixel, the second sub-pixel, and the third sub-pixel has a first ratio of the length of the first junction to the length of the first outline; and
the first ratios of at least two of the first sub-pixel, the second sub-pixel, and the third sub-pixel being substantially different,
wherein the first ratio of the first sub-pixel is substantially greater than the first ratio of the second sub-pixel, and the first ratio of the second sub-pixel is substantially equal to the first ratio of the third sub-pixel.

19. The pixel structure according to claim 18, wherein the at least four sides of the first outline comprise a plurality of first sides arranged in a first direction and a plurality of second sides arranged in a second direction, one of the first connecting electrodes is disposed on the first sides and the second sides of the first sub-pixel, one of the first connecting electrodes is disposed on the first sides of the second sub-pixel, none of the first connecting electrodes are disposed on at least one of the second sides of the second sub-pixel, one of the first connecting electrodes is disposed on the first sides of the third sub-pixel, and none of the first connecting electrodes are disposed on at least one of the second sides of the third sub-pixel.

20. The pixel structure according to claim 18, further comprising:
a plurality of second pixel electrodes, structurally separated from the first pixel electrodes, the second pixel electrodes being formed in the first sub-pixel, the second sub-pixel, and the third sub-pixel respectively to control the alignment direction of the liquid crystal molecules of the liquid crystal layer, each of the second pixel electrodes comprising a plurality of second branch portions, each of the second pixel electrodes having a second outline, the second outline being located at a plurality of endpoints of the second branch portions, and the second outline comprising at least four sides; and
a plurality of second connecting electrodes, formed in the first sub-pixel, the second sub-pixel, and the third sub-pixel, respectively, and disposed on at least one portion of the second outlines of the second pixel electrodes,
wherein the second branch portions of each of the second pixel electrodes and one of the second connecting electrodes have a second junction, the second junction is located on the second outline, the second junction has a length, the second outline has a length, and each of the first sub-pixel, the second sub-pixel, and the third sub-pixel has a second ratio of the length of the second junction to the length of the second outline; and
the second ratios of at least two of the first sub-pixel, the second sub-pixel, and the third sub-pixel being substantially different.

21. The pixel structure according to claim 20,
wherein the at least four sides of the second outline comprise a plurality of first sides arranged in a first direction and a plurality of second sides arranged in a second direction, one of the second connecting electrodes is disposed on the first sides and the second sides of the first sub-pixel, one of the second connecting electrodes is disposed on the first sides of the second sub-pixel, none of the second connecting electrodes are disposed on at least one of the second sides of the second sub-pixel, one of the second connecting electrodes is disposed on the first sides of the third sub-pixel, and none of the second connecting electrodes are disposed on at least one of the second sides of the third sub-pixel.

22. The pixel structure according to claim 20, wherein the second ratio of the first sub-pixel is substantially greater than the second ratio of the second sub-pixel, and the second ratio of the first sub-pixel is substantially equal to the second ratio of the third sub-pixel.

23. The pixel structure according to claim 20, wherein the second ratio of the first sub-pixel is substantially greater than the second ratio of the second sub-pixel, and the second ratio of the second sub-pixel is substantially greater than the second ratio of the third sub-pixel.

24. The pixel structure according to claim 20, wherein the first ratio of one of the first sub-pixel, the second sub-pixel, and the third sub-pixel is substantially different from the second ratio of the one of the first sub-pixel, the second sub-pixel, and the third sub-pixel.

25. The pixel structure according to claim 20, wherein the second ratio of the first sub-pixel and the second ratio of the second sub-pixel has a difference $\Delta R2$, and $10\% \leq \Delta R2 \leq 75\%$.

26. A pixel structure adapted to a display device, the display device being formed by sandwiching a liquid crystal layer between a first substrate and a second substrate, the pixel structure comprising:
 a first sub-pixel, a second sub-pixel, and a third sub-pixel;
 a plurality of first pixel electrodes, formed in the first sub-pixel, the second sub-pixel, and the third sub-pixel respectively to control an alignment direction of a plurality of liquid crystal molecules of the liquid crystal layer, each of the first pixel electrodes comprising a plurality of first branch portions, each of the first pixel electrodes comprising a first outline, the first outline being located at a plurality of endpoints of the first branch portions, and the first outline comprising at least four sides; and
 a plurality of first connecting electrodes, formed in the first sub-pixel, the second sub-pixel, and the third sub-pixel, respectively, and disposed on at least one portion of the first outlines of the first pixel electrodes,
 wherein the first branch portions of each of the first pixel electrodes and one of the first connecting electrodes have a first junction, the first junction is located on the first outline, the first junction has a length, the first outline has a length, and each of the first sub-pixel, the second sub-pixel, and the third sub-pixel has a first ratio of the length of the first junction to the length of the first outline; and
 the at least four sides of the first outline comprise a plurality of first sides arranged in a first direction and a plurality of second sides arranged in a second direction, one of the first connecting electrodes is disposed on the first sides and the second sides of the first sub-pixel, one of the first connecting electrodes is disposed on the first sides of the second sub-pixel, none of the first connecting electrodes are disposed on at least one of the second sides of the second sub-pixel, one of the first connecting electrodes is disposed on the first sides of the third sub-pixel, and none of the first connecting electrodes are disposed on at least one of the second sides of the third sub-pixel.

27. The pixel structure according to claim 26, further comprising:
 a plurality of second pixel electrodes, structurally separated from the first pixel electrodes, the second pixel electrodes being formed in the first sub-pixel, the second sub-pixel, and the third sub-pixel respectively to control the alignment direction of the liquid crystal molecules of the liquid crystal layer, each of the second pixel electrodes comprising a plurality of second branch portions, each of the second pixel electrodes having a second outline, the second outline being located at a plurality of endpoints of the second branch portions, and the second outline comprising at least four sides; and
 a plurality of second connecting electrodes, formed in the first sub-pixel, the second sub-pixel, and the third sub-pixel, respectively, and disposed on at least one portion of the second outlines of the second pixel electrodes,
 wherein the second branch portions of each of the second pixel electrodes and one of the second connecting electrodes have a second junction, the second junction is located on the second outline, the second junction has a length, the second outline has a length, and each of the first sub-pixel, the second sub-pixel, and the third sub-pixel has a second ratio of the length of the second junction to the length of the second outline.

28. The pixel structure according to claim 27, wherein the at least four sides of the second outline comprise a plurality of first sides arranged in a first direction and a plurality of second sides arranged in a second direction, one of the second connecting electrodes is disposed on the first sides and the second sides of the first sub-pixel, one of the second connecting electrodes is disposed on the first sides of the second sub-pixel, none of the second connecting electrodes are disposed on at least one of the second sides of the second sub-pixel, one of the second connecting electrodes is disposed on the first sides of the third sub-pixel, and none of the second connecting electrodes are disposed on at least one of the second sides of the third sub-pixel.

29. The pixel structure according to claim 28, wherein the second ratio of the first sub-pixel is substantially greater than the second ratio of the second sub-pixel, and the second ratio of the second sub-pixel is substantially equal to the first ratio of the third sub-pixel.

30. The pixel structure according to claim 26, wherein the first ratio of the first sub-pixel is substantially greater than the first ratio of the second sub-pixel, and the first ratio of the second sub-pixel is substantially equal to the first ratio of the third sub-pixel.

* * * * *